(12) United States Patent
Hirano et al.

(10) Patent No.: US 9,248,720 B2
(45) Date of Patent: Feb. 2, 2016

(54) UTILITY PART ASSEMBLY FOR MOUNTING UTILITY PART TO VEHICULAR INTERIOR PART

(75) Inventors: Hirokazu Hirano, Tokoname (JP); Yuji Sasaki, Toyota (JP)

(73) Assignees: TOYOTA BOSHOKU KABUSHIKI KAISHA, Aichi-Ken (JP); NIFCO INC., Kanagawa-Ken (JP)

( * ) Notice: Subject to any disclaimer, the term of this patent is extended or adjusted under 35 U.S.C. 154(b) by 94 days.

(21) Appl. No.: 13/467,276

(22) Filed: May 9, 2012

(65) Prior Publication Data

US 2012/0286115 A1 Nov. 15, 2012

(30) Foreign Application Priority Data

May 12, 2011 (JP) ................................. 2011-107505
Mar. 30, 2012 (JP) ................................. 2012-081026

(51) Int. Cl.
*B60J 3/00* (2006.01)
*B60J 1/20* (2006.01)
*B60J 3/02* (2006.01)
(Continued)

(52) U.S. Cl.
CPC ............... *B60J 1/2063* (2013.01); *B60J 3/023* (2013.01); *B60J 3/002* (2013.01); *B60J 3/005* (2013.01); *Y10T 24/30* (2015.01); *Y10T 24/301* (2015.01);
(Continued)

(58) Field of Classification Search
CPC ....... F16B 21/02; F16B 21/04; Y10T 24/309; Y10T 24/301; Y10T 24/30; Y10T 24/45105; B60J 3/023; B60J 3/002; B60J 3/0005

USPC ....................... 248/266, 267, 221.11, 231.91; 296/97.9; 411/349, 549, 553
See application file for complete search history.

(56) References Cited

U.S. PATENT DOCUMENTS 3,017,217 A * 1/1962 Keating ..................... 296/97.13
4,475,147 A * 10/1984 Kristofek ....................... 362/148
(Continued)

FOREIGN PATENT DOCUMENTS

CN 101641230 A 2/2010
JP 09-011752 1/1997
(Continued)

OTHER PUBLICATIONS

U.S. Appl. No. 13/467,156 to Hirokazu Hirano, which was filed May 9, 2012.
(Continued)

*Primary Examiner* — Syed A Islam
*Assistant Examiner* — Taylor Morris
(74) *Attorney, Agent, or Firm* — Greenblum & Bernstein, P.L.C.

(57) ABSTRACT

A utility part assembly includes a vehicular interior part and a utility part. The vehicular interior part has a first surface and a second surface that is opposite to the first surface and has a first mounting hole and a second mounting hole. The utility part includes a first member provided on the first surface and a second member provided on the second surface. The first member has a first coupling pin and one of a second coupling pin and a first coupling hole, and the second member has a coupling portion that is coupled to the first coupling pin and another one of the second coupling pin and the first coupling hole. The first coupling pin is inserted through the first mounting hole and coupled to the coupling portion, and the second coupling pin is inserted through the second mounting hole and coupled to the first coupling hole.

14 Claims, 21 Drawing Sheets

(51) Int. Cl.
- *A47B 96/00* (2006.01)
- *A47K 1/00* (2006.01)
- *A47K 5/00* (2006.01)
- *E04G 5/06* (2006.01)
- *F16L 3/08* (2006.01)
- *F21V 21/00* (2006.01)
- *F21V 35/00* (2006.01)
- *A47B 96/06* (2006.01)
- *A47H 1/10* (2006.01)
- *A47H 1/13* (2006.01)
- *E06B 9/17* (2006.01)
- *A44B 1/04* (2006.01)
- *A44B 11/25* (2006.01)
- *A44B 17/00* (2006.01)
- *E04F 19/02* (2006.01)
- *A47C 27/045* (2006.01)

(52) U.S. Cl.
CPC .......... *Y10T 24/309* (2015.01); *Y10T 24/45105* (2015.01)

(56) References Cited

U.S. PATENT DOCUMENTS

| | | |
|---|---|---|
| 5,860,466 A | 1/1999 | Kao |
| 6,347,775 B1 | 2/2002 | Edlinger |
| 6,491,333 B2 * | 12/2002 | Ichikawa et al. ............. 296/97.9 |
| 6,511,116 B1 * | 1/2003 | De Jongh et al. ............ 296/97.9 |
| 7,967,360 B2 | 6/2011 | Holden et al. |
| 2001/0022336 A1 * | 9/2001 | Sawayanagi ............. 248/292.12 |
| 2002/0017800 A1 | 2/2002 | Ichikawa et al. |
| 2006/0110235 A1 * | 5/2006 | Dembowsky et al. ........ 411/349 |
| 2007/0068638 A1 | 3/2007 | Puskarz et al. |
| 2010/0162534 A1 * | 7/2010 | Kato ............................... 24/292 |
| 2010/0187851 A1 | 7/2010 | Holden et al. |

FOREIGN PATENT DOCUMENTS

| | | | |
|---|---|---|---|
| JP | 2000-203260 | 7/2000 | |
| JP | 2001-080355 | 3/2001 | |
| JP | 2002-046469 A | 2/2002 | |
| WO | WO 2008115921 A1 * | 9/2008 | ............... B60J 3/02 |
| WO | WO 2009008185 A1 * | 1/2009 | |

OTHER PUBLICATIONS

China Office action, dated Nov. 19, 2014 along with an English translation thereof.

Chinese Office action dated Mar. 24, 2014, along with an English-language translation thereof.

Japan Office action, dated Jun. 2, 2015 along with an English translation thereof.

* cited by examiner

FIG.8
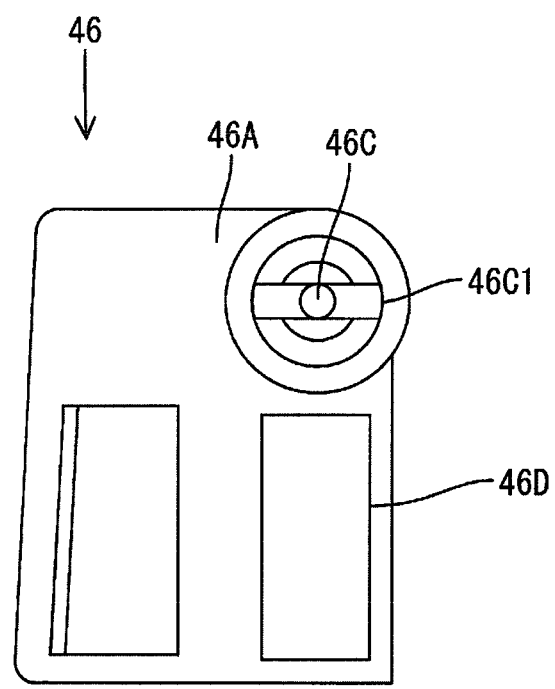
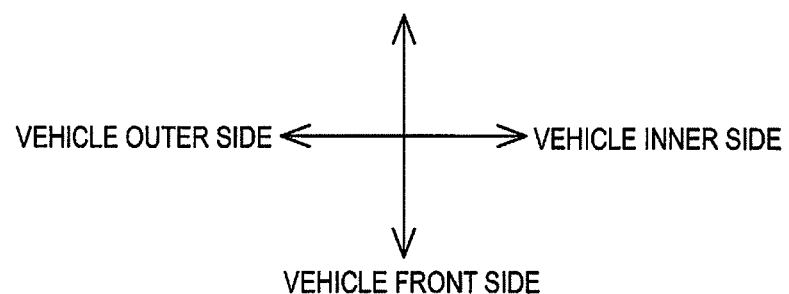

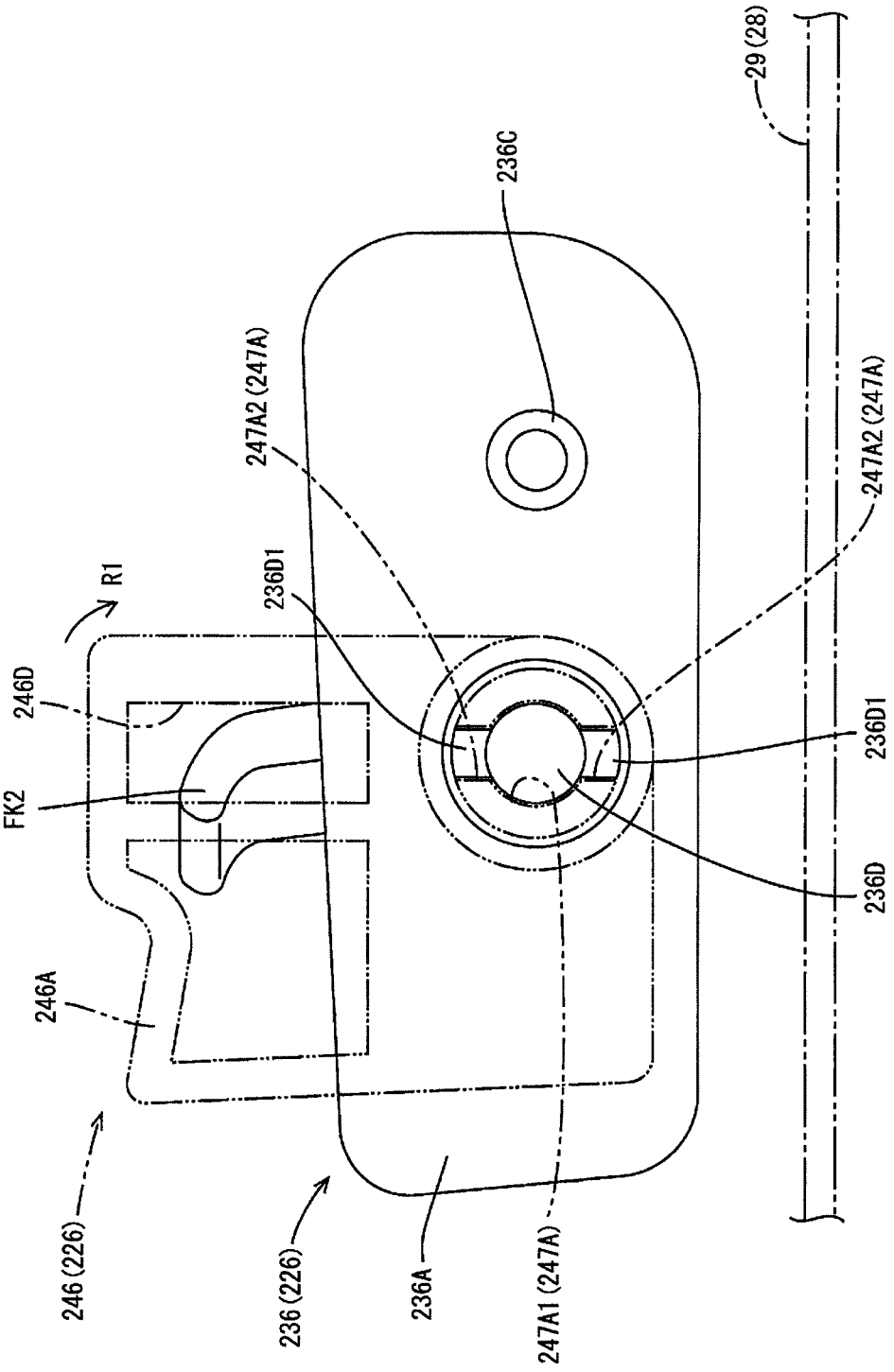

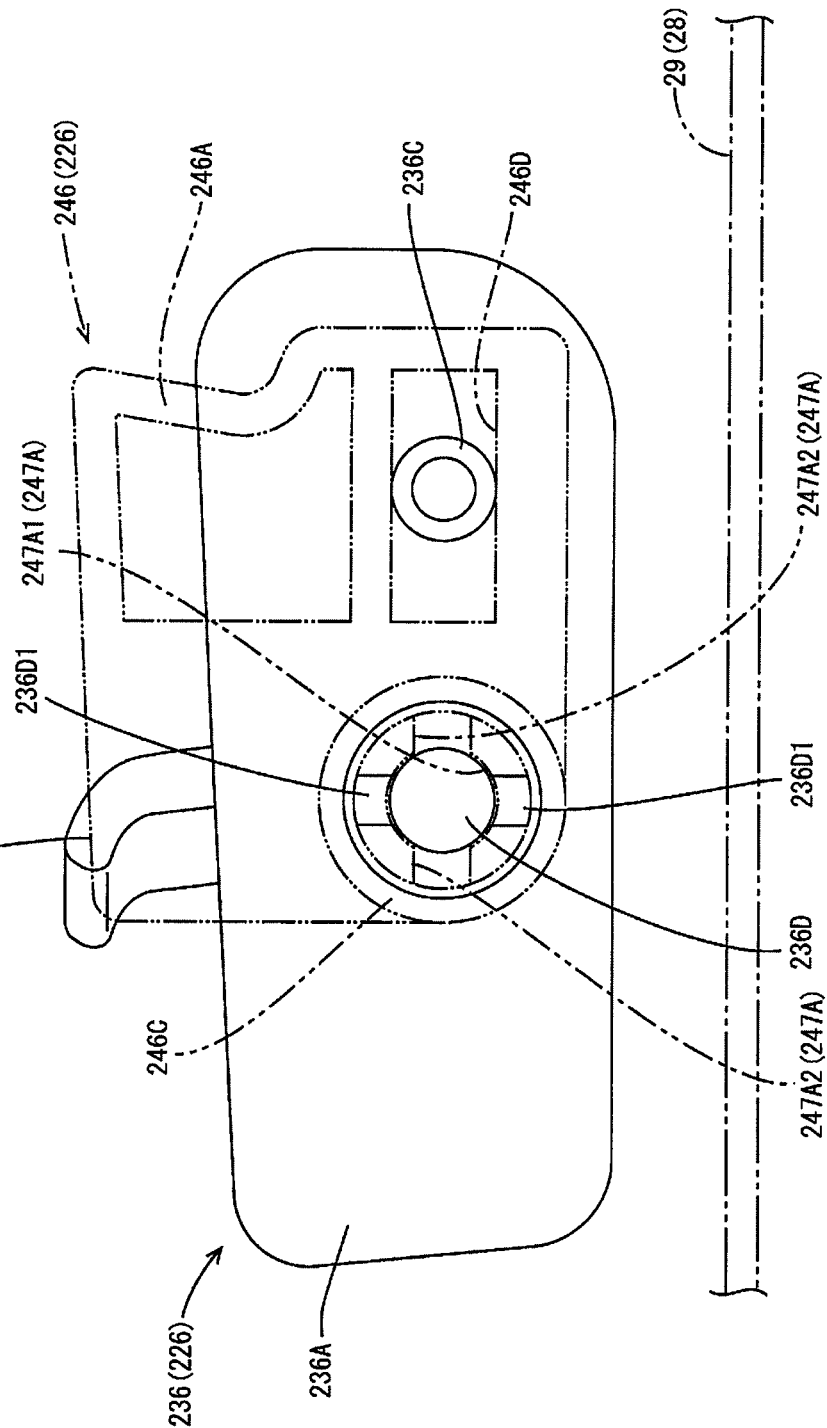

UTILITY PART ASSEMBLY FOR MOUNTING UTILITY PART TO VEHICULAR INTERIOR PART

CROSS REFERENCE TO RELATED APPLICATION

This application claims priority from Japanese Patent Application Nos. 2011-107505 filed on May 12, 2011 and 2012-81026 filed on Mar. 30, 2012. The entire contents of these priority applications are incorporated herein by reference.

FIELD OF THE INVENTION

The present disclosure relates to a utility part assembly for mounting utility parts to a vehicular interior part.

BACKGROUND OF THE INVENTION

Various utility parts such as an armrest are mounted to a vehicular interior part. A sunshade is provided in a vehicle and the sunshade is extended to shield light or sunlight that is shining through a side window of the vehicle. A hook member that keeps the sunshade in an extended state may be an example of such various utility parts that are mounted to a vehicular interior part.

Published patent application JP-A-2002-46469 discloses a mounting assembly for mounting a hook member that keeps the sunshade in the extended state. The sunshade is mounted to a vehicle door. In such a mounting assembly, the hook member is previously mounted to a frame garnish made of resin and the frame garnish is attached to a window frame that is provided to surround the side window of the vehicle door. Thus, the hook member is fixed to the window frame.

In the mounting assembly disclosed in published patent application JP-A-2002-46469, the hook member is fixed to the frame garnish with screws. This requires screw holes to be previously provided in the frame garnish in the manufacturing process so as to mount the hook member to the frame garnish. In such a case, it requires labor and takes time to fix the hook member with screws, and therefore it is not easy to mount the hook member to the frame garnish. In such a conventional mounting assembly, the screw holes are provided in the vehicular interior part such that the utility parts such as the hook member are mounted to the vehicular interior part, and therefore, it is not easy to mount the utility parts to the vehicular interior part stably.

SUMMARY OF THE INVENTION

The present invention has been made in view of the aforementioned circumstances. An objective of the present invention is to provide a utility part assembly for mounting a utility part to a vehicular interior part easily and stably.

A technology described herein relates to a utility part assembly for a vehicle. The utility part assembly includes a vehicular interior part and a utility part. The vehicular interior part has a first surface and a second surface that is opposite to the first surface and also has a first mounting hole and a second mounting hole. The utility part includes a first member provided on the first surface of the vehicular interior part and a second member provided on the second surface. The first member has a first coupling pin and at least one of a second coupling pin and a first coupling hole, and the second member has a coupling portion that is coupled to the first coupling pin and at least another one of the second coupling pin and the first coupling hole. The first coupling pin is inserted through the first mounting hole and coupled to the coupling portion, and the second coupling pin is inserted through the second mounting hole and coupled to the first coupling hole. The first member and the second member sandwich a part of the vehicular interior part therebetween.

With the utility part assembly, in the process of mounting the utility part, the first mounting hole and the second mounting hole are formed in the vehicular interior part and the first coupling pin is inserted through the first mounting hole and the second coupling pin is inserted through the second mounting hole. Accordingly, the first member and the second member are coupled to each other and the utility part is mounted to the vehicular interior part. Therefore, the utility part is mounted to the vehicular interior part easily and stably. The shape of the coupling portion is not specified but may be formed in a groove or in a hole, for example.

BRIEF DESCRIPTION OF THE DRAWINGS

FIG. 8 is a plan view of a clip portion of the hook member;

FIG. 20 is a plan view of a clip portion and the upper surface portion of the door trim in a process in which the clip portion is mounted to the upper surface portion; and FIG. 21 is a plan view of the clip portion that is mounted to the upper surface portion of the door trim.

DETAILED DESCRIPTION OF THE PREFERRED EMBODIMENTS

<First Embodiment>

Figure 1:
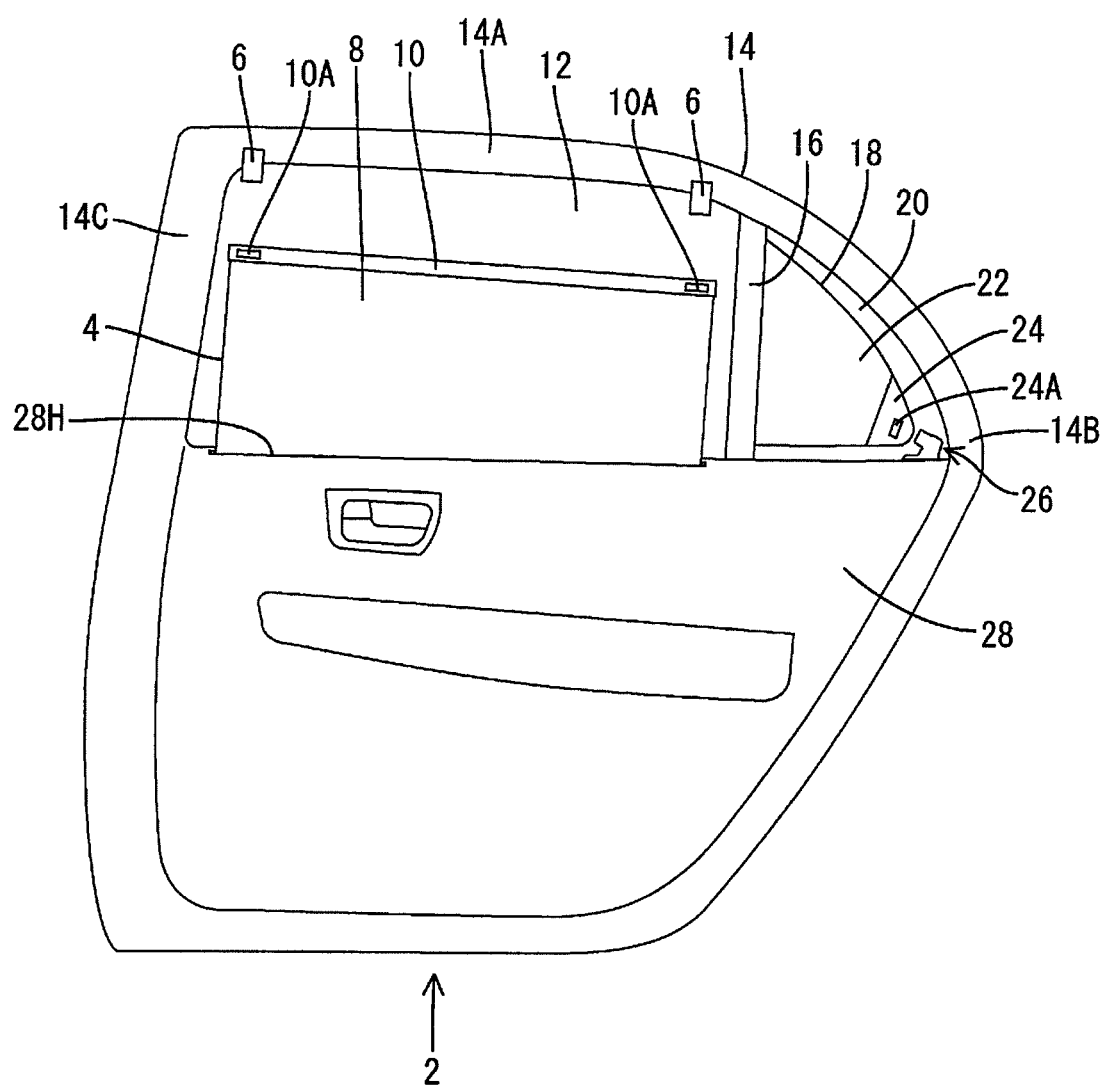
FIG. 1 is a front view of a vehicle door of a first embodiment.

The first embodiment will be explained with reference to the drawings. A vehicle door 2 of the first embodiment will be explained with reference to FIG. 1. As illustrated in FIG. 1, the vehicle door 2 includes side windows (an example of a window) 12, 20. Each of the side windows 12, 20 is defined by a division frame that is a part of a window frame 14. The side window 12 is provided on a vehicle front side and the side window 20 is provided on a vehicle rear side. An outer rim of each side window 12, 20 is surrounded by the window frame 14. A door trim (an example of a vehicular interior part) 28 is provided on a lower side of each side window 12, 20. The vehicle front side corresponds to a left side in FIG. 1 and the vehicle rear side corresponds to a right side in FIG. 1.

The window frame 14 is formed of a metal material and includes a straight portion 14A, a curved portion 14B and a front rim portion 14C. The straight portion 14A surrounds an upper outer rim of the side windows 12, 20. The curved portion 14B is formed to be bent from the straight portion 14A and surrounds a vehicle rear side outer rim. The front rim portion 14C surrounds a front outer rim of the side window 12. Each of the straight portion 14A, the curved portion 14B and the front rim portion 14C is formed in a hollow shape.

A first sunshade 4 is provided at a lower portion of the side window 12 that is provided on the vehicle front side. The first sunshade 4 includes a first blind sheet 8 and a first frame 10. The first blind sheet 8 is extended to shield light shining through the side window 12. The first frame 10 is attached to a distal end portion of the first blind sheet 8. A housing opening 28H is formed in a part of an upper surface portion 28A of the door trim 28 (see FIG. 2) that is located on a lower side of th4 side widow 12. The first blind sheet 8 is housed in the housing opening 28H and extended from the housing opening 28H by a rewinding mechanism (not illustrated). Therefore, the first blind sheet 8 is expanded and rewound in an up-and-down direction of a vehicle (in an up-and-down direction in FIG. 1).

As illustrated in FIG. 1, the first frame 10 is attached to a distal end portion of the first blind sheet 8 along its end side. A first stopper hole 10A is formed on either ends of the first frame 10. Hooks 6 are provided on the straight portion 14A of the window frame 14 such that each of the hooks 6 corresponds to each of the first stopper holes 10A when the first sunshade 4 is extended. Mounting holes (not illustrated) are formed in the straight portion 14A of the window frame 14 and the hooks 6 are mounted to the mounting holes to be fixed to the straight portion 14A of the window frame 14 with screws. A distal end of the hook 6 is formed in a hooked shape and the hook 6 is engaged with the first stopper hole 10A provided in the first sunshade 4. The engagement of the hooks 6 and the first stopper holes 10A keeps the first sunshade 4 in a state in that the first blind sheet 8 is extended.

A second sunshade (an example of a sunshade) 18 is provided to the division frame 16. The second sunshade 18 includes a second blind sheet 22 and a second frame 24. The second blind sheet 22 is extended to shield light shining through the side window 20 that is provided on the vehicle rear side. The second frame 24 is provided on a distal end portion of the second blind sheet 22. A housing opening (not illustrated) is provided in the division frame 16. The second blind sheet 22 is housed in the housing opening and extended from the housing opening by a rewinding mechanism (not illustrated). Therefore, the second blind sheet 22 moves along the upper surface portion 28A of the door trim 28 that is along a front-and-rear direction of the vehicle (a left-and-right direction in FIG. 1) to be housed in and expanded from the housing opening.

As illustrated in FIG. 1, the second frame 24 is provided at a distal end corner of the second blind sheet 22 and formed in substantially a triangle so as to follow a shape of the distal end corner. A second stopper hole 24A is formed at a distal end of the second frame 24. A hook member (an example of the utility part) 26 is provided on a vehicle rear side part of the upper surface portion 28A of the door trim 28. The hook member 26 is provided directly to the upper surface portion 28A of the door trim 28.

Figure 2:
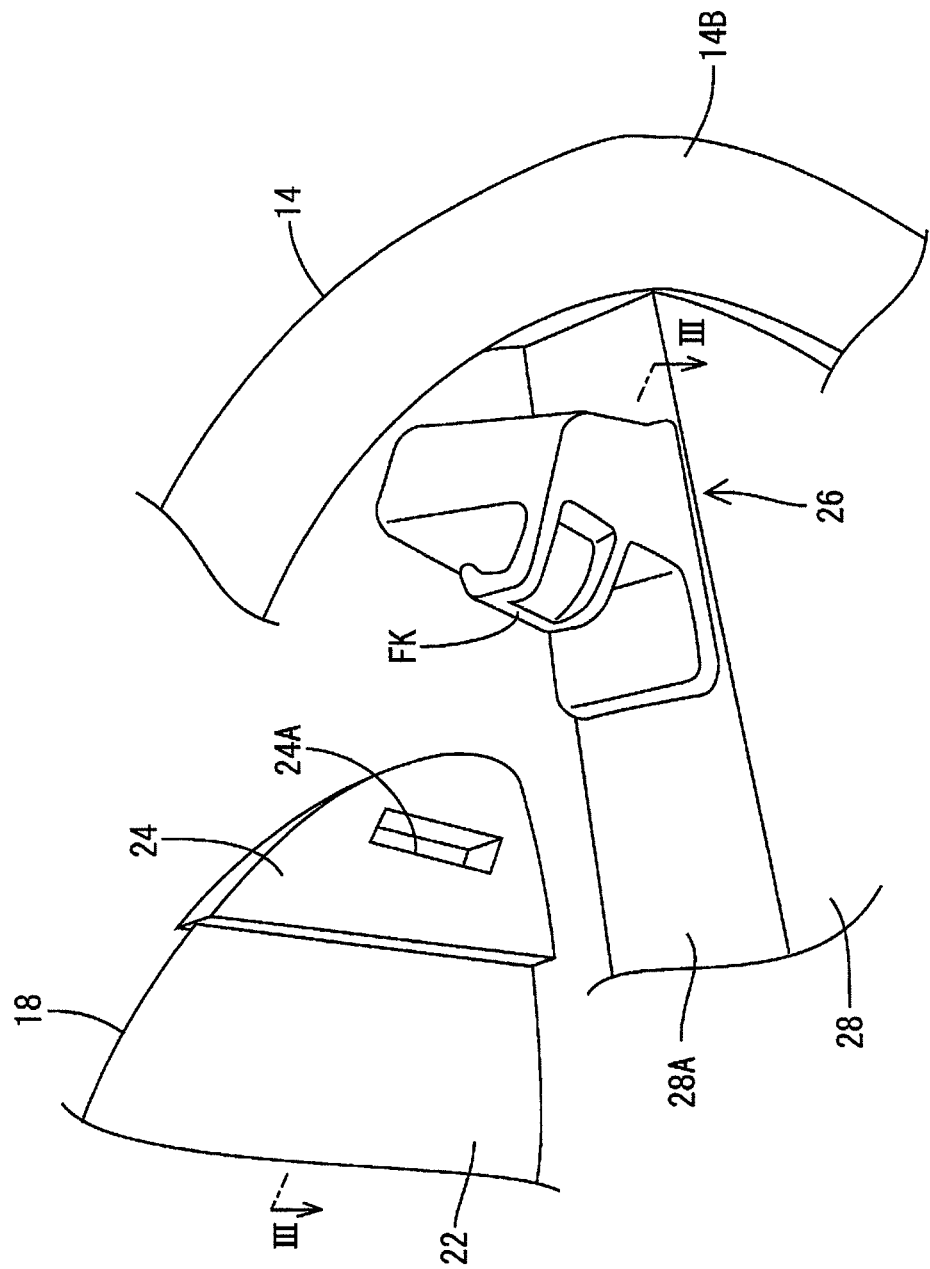
FIG. 2 is an enlarged perspective view of a part of the vehicle door in adjacent to a hook member.
Figure 3:
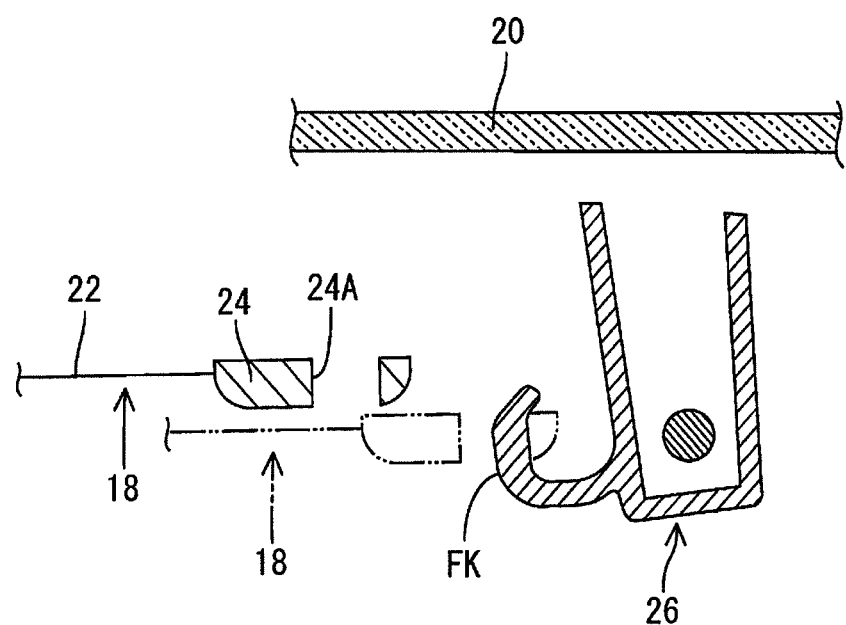
FIG. 3 is a cross-sectional view of the part of the vehicle door in FIG. 2 taken along a III-III line and seen from above in FIG. 2.

A configuration of the hook member 26 will be explained with reference to FIGS. 2 to 5. As illustrated in FIGS. 2 and 3, the hook member 26 includes a stopper hook (an example of a stopper portion) FK such that the second stopper hole 24A corresponds to the stopper hook FK when the second sunshade 18 is extended in the front-and-rear direction (the left-and-right direction in FIG. 1). The stopper hook FK is formed in a hooked shape so as to be coupled to the second stopper hole 24A formed in the second frame 24 of the second sunshade 18. The stopper hook FK is coupled to the second stopper hole 24A and the coupling keeps the second sunshade 18 such that the second blind sheet 22 is extended (see a two-dot chain line in FIG. 3).

Figure 4:
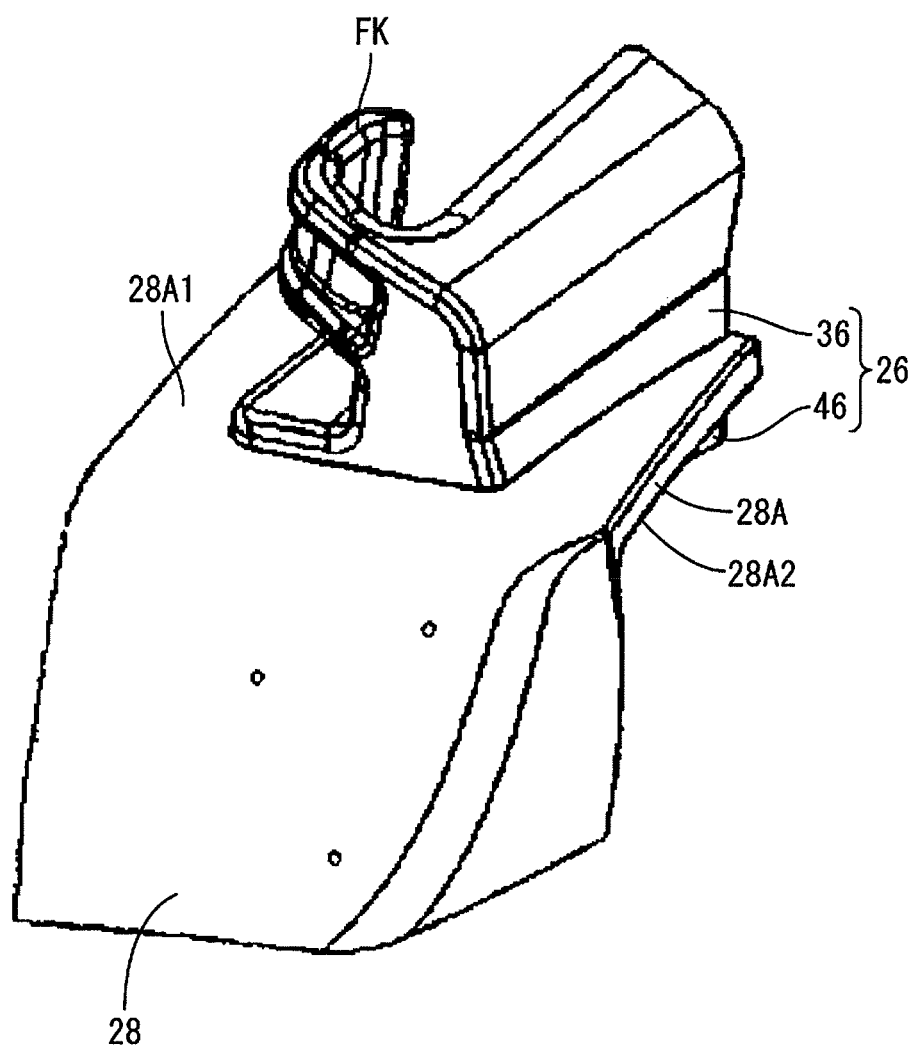
FIG. 4 is a perspective view of a part of an upper surface portion of a door trim and the hook member provided on the part of the upper surface portion seen from a front side.
Figure 5:
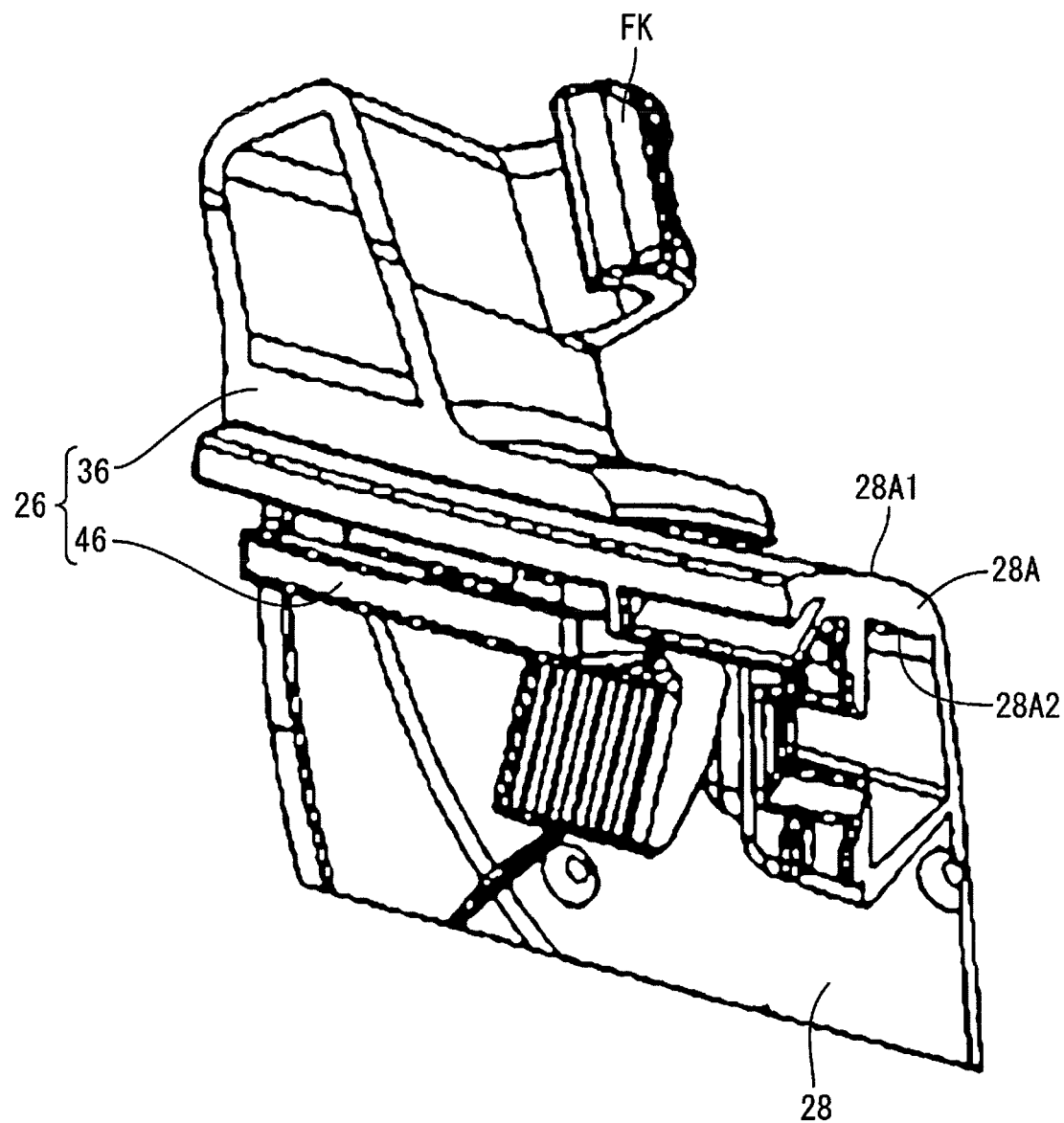
FIG. 5 is a perspective view of a part of the upper surface portion of the door trim and the hook member provided on the part of the upper surface portion seen from a rear side.

As illustrated in FIGS. 4 and 5, the hook member 26 includes a main body (an example of a first member) 36 and a clip portion (an example of a second member) 46. The main body 36 is provided on a front surface 28A1 of the upper surface portion 28A of the door trim 28. The clip portion 46 is provided on a rear surface 28A2 of the upper surface portion 28A of the door trim 28. The main body 36 and the clip portion 46 are fitted to each other and coupled to each other to form the hook member 26. The main body 36 and the clip portion 46 sandwich the upper surface portion 28A of the door trim 28 from the front and rear sides. Accordingly, the hook member 26 is provided on the upper surface portion 28A of the door trim 28.

Figure 6:
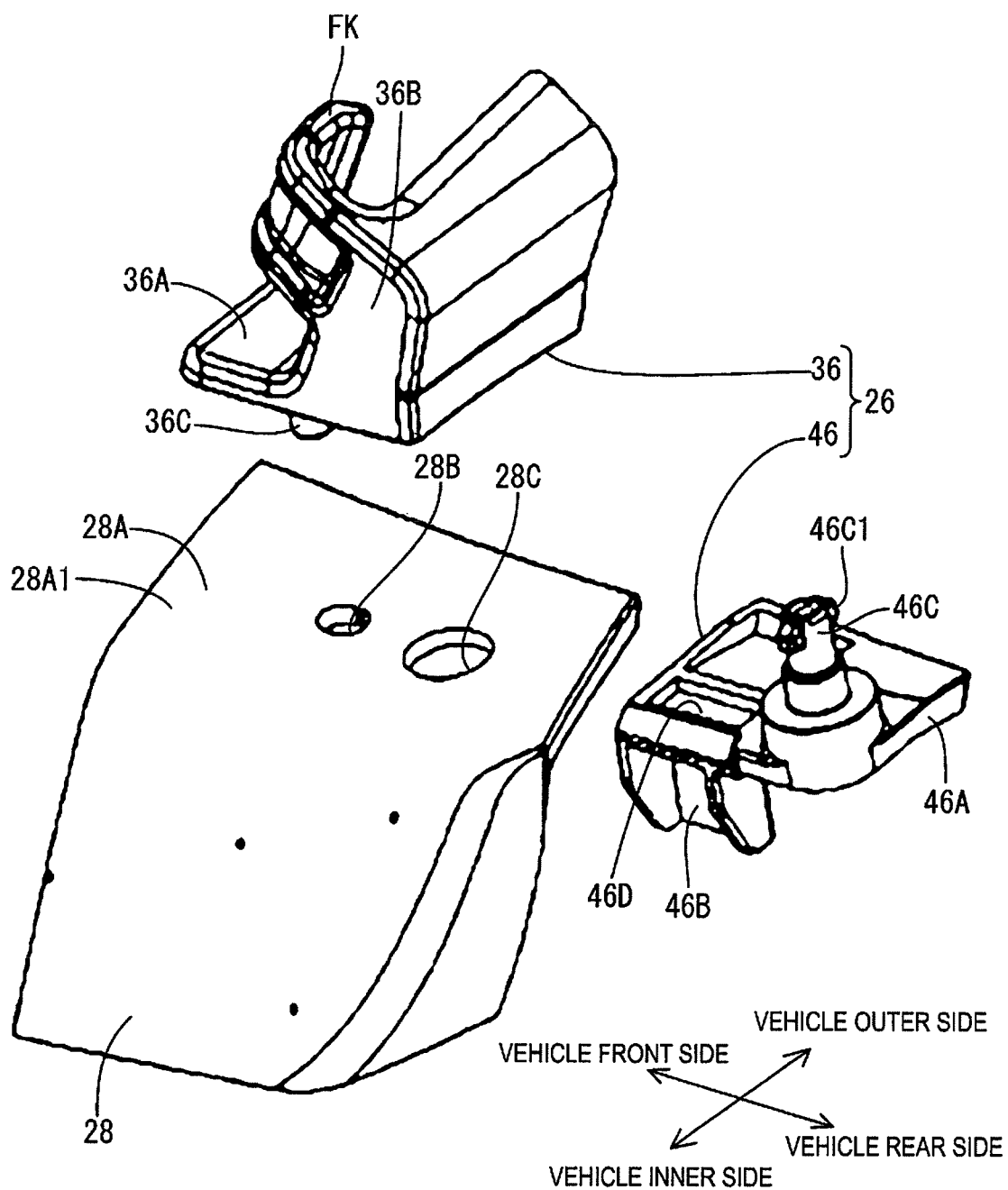
FIG. 6 is an exploded perspective view of a part of the upper surface portion of the door trim and a main body of the hook member and a clip portion.
Figure 7:
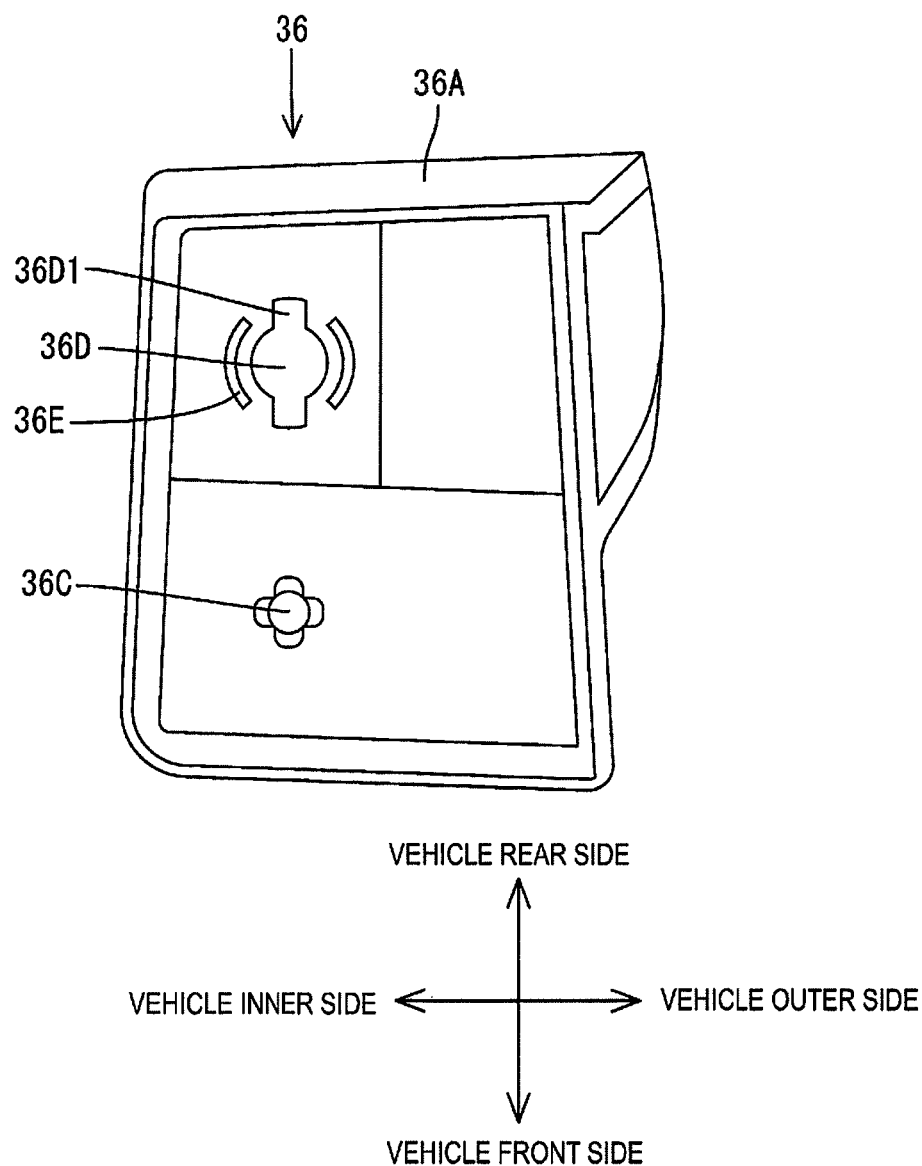
FIG. 7 is a rear view of the main body of the hook member.

Next, mounting of the hook member 26 to the upper surface portion 28A of the door trim 28 will be explained in detail with reference to FIGS. 6 to 8. The arrangement direction of the main body 36 and the clip portion 46 in FIG. 6 corresponds to the arrangement direction of the main body 36 and the clip portion 46 in a state that the hook member 26 is mounted on the upper surface portion 28A of the door trim 28. Rear surfaces of the main body 36 and the clip portion 46 in the state of FIG. 6 are illustrated in FIGS. 7 and 8. The directions described in each of FIGS. 6 to 8 correspond to each other. In the following, the front and rear sides of the vehicle in the state of FIG. 6 corresponds to the front and rear sides of the main body 36 (the clip portion 46), respectively, and the inner and outer sides of a vehicle compartment in the state of FIG. 6 corresponds to the inner and outer sides of the main body 36 (the clip portion 46), respectively, and the upper and lower sides of the vehicle in the state of FIG. 6 corresponds to the upper and lower sides of the main body 36 (the clip portion 46), respectively.

The main body 36 of the hook member 26 will be explained. As illustrated in FIG. 6, the main body 36 includes a contact portion 36A and a lifted portion 36B. The contact portion 36A is formed in a flat plate and comes in contact with the front surface 28A1 of the upper surface portion 28A of the door trim 28. The lifted portion 36B is lifted up from a part of the contact portion 36A. The stopper hook FK is formed on an upper end portion of the lifted portion 36B that faces the second sunshade 18. The stopper hook FK extends obliquely upward from the upper end portion of the lifted portion 36B. As illustrated in FIG. 7, a first coupling pin 36C, a first coupling hole 36D (an example of one of the second coupling pin and the first coupling hole) and a guide 36E are formed on the rear surface of the main body 36 (on the rear surface of the contact portion 36A). The first coupling pin 36C is formed to axially project from the contact portion 36A downwardly (refer to FIG. 6). The first coupling hole 36D is formed in a key hole and is configured by a circular opening and side openings 36D1 each of which extends from the circular opening toward the front side and the rear side of the main body 36. Two guides 36E are provided to surround either sides of the first coupling hole 36D. Each of the guides 36E is formed in an arched shape and projects downwardly.

Next, the clip portion 46 of the hook member 26 will be explained. As illustrated in FIG. 6, the clip portion 46 includes a contact portion 46B and a lifted portion 46B. The contact portion 46A is formed in a flat plate that comes in contact with the rear surface of the upper surface portion 28A of the door trim 28. The lifted portion 46B is lifted up from a part of the contact portion 46A. As illustrated in FIG. 8, a second coupling pin 46C (an example of another one of the second coupling pin and the first coupling hole) and a coupling groove (an example of a coupling member) 46D are formed on the contact portion 46A. The second coupling pin 46C is formed to axially project from the contact portion 46A upwardly. Projections 46C1 are provided on a distal end of the second coupling pin 46C. Ends of the projections 46C1 extend and project from the second coupling pin 46C in opposite directions. The coupling groove 46D has an opening that is formed in a rectangular shape. The coupling groove 46D is formed in a groove having a width in a thickness direction of the contact portion 46A.

Next, a part of the upper surface portion 28A of the door trim 28 to which the hook member 26 is mounted will be explained. As illustrated in FIG. 6, a first mounting hole 28B and a second mounting hole 28C are formed on a portion of the upper surface portion 28A of the door trim 28 to which the hook member 26 is mounted. The first mounting hole 28B and the second mounting hole 28C are formed through the upper surface portion 28A. The first mounting hole 28B is formed such that the first coupling pin 36C of the main body 36 is inserted therethrough. The second mounting hole 28C is formed such that the second coupling pin 46C of the clip portion 46 and the guides 36E are inserted therethrough. The second mounting hole 28C is formed such that an opening rim of the second mounting hole 28C substantially comes in contact with outer surfaces of the guides 36E when the guides 36E are inserted through the second mounting hole 28C. The distal end of the first coupling pin 36C of the main body 36 slightly projects downwardly from the rear surface 28A2 of the upper surface portion 28A when the first coupling pin 36C is inserted through the second mounting hole 28C of the upper surface portion 28A.

The first coupling hole 36D of the main body 36 is formed to receive the second coupling pin 46C after being positioned such that the projection 46C1 of the second coupling pin 46C corresponds to the side opening 36D1 of the first coupling hole 36D. The coupling groove 46D of the clip portion 46 is formed to receive the first coupling pin 36C. The main body 36 is moved closer to the front surface 28A1 of the upper surface portion 28A of the door trim 28 and the clip portion 46 is moved closer to the rear surface 28A2 of the upper surface portion 28A such that the main body 36 and the clip portion 46 get closer to each other. Accordingly, the first coupling pin 36C is inserted through the first mounting hole 28B on the upper surface portion 28A and inserted in the coupling groove 46D. Also, the second coupling pin 46C is inserted through the second mounting hole 28C and inserted through the first coupling hole 36D.

A mounting method of mounting the main body 36 and the clip portion 46 of the hook member 26 to the upper surface portion 28A of the door trim 28 will be explained with reference to FIGS. 9 to 13.

Figure 9:
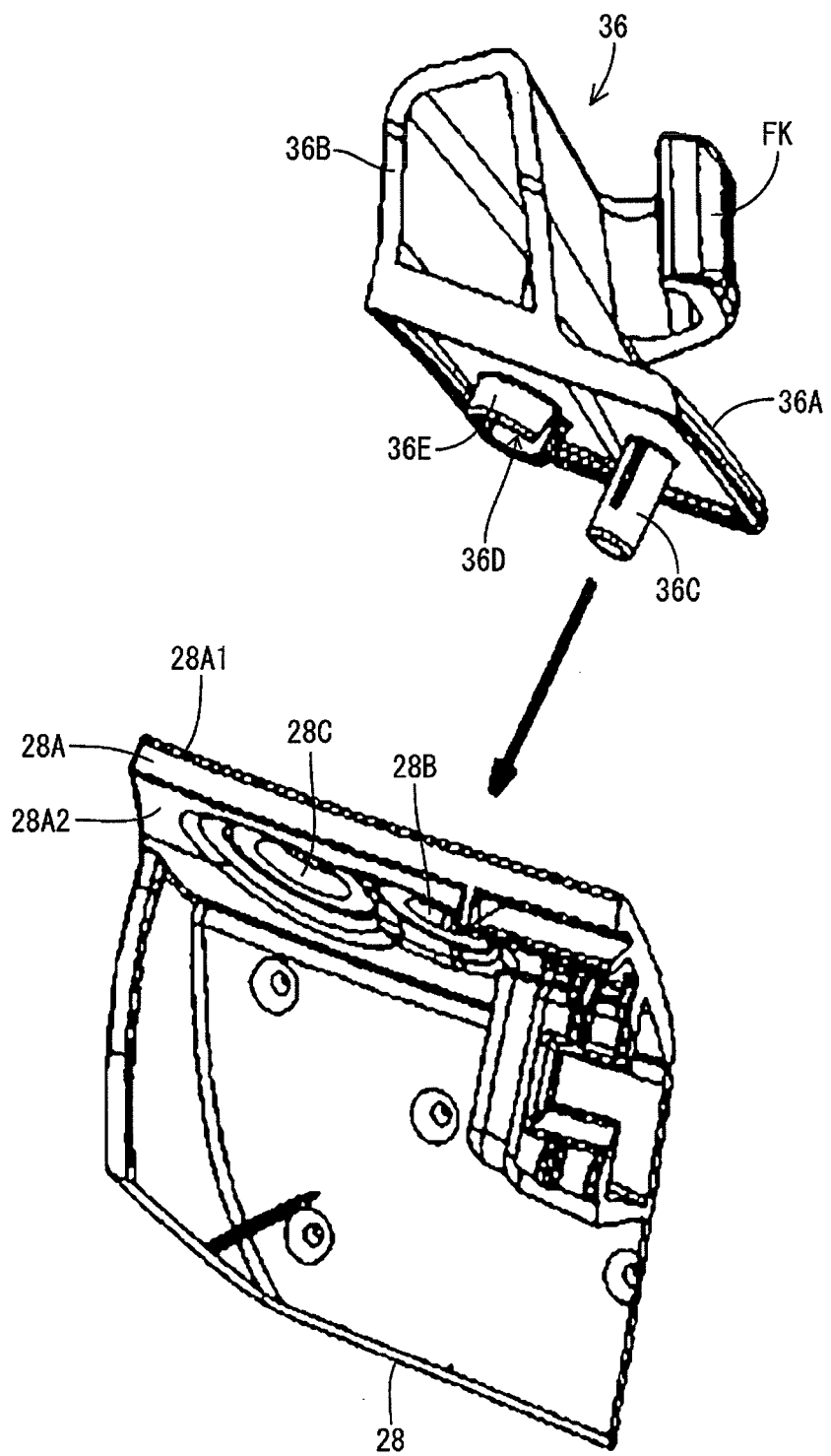
FIG. 9 is a perspective view of the hook member and the upper surface portion of the door trim in a process (1) in which the hook member is mounted to a part of the upper surface portion.
Figure 10:
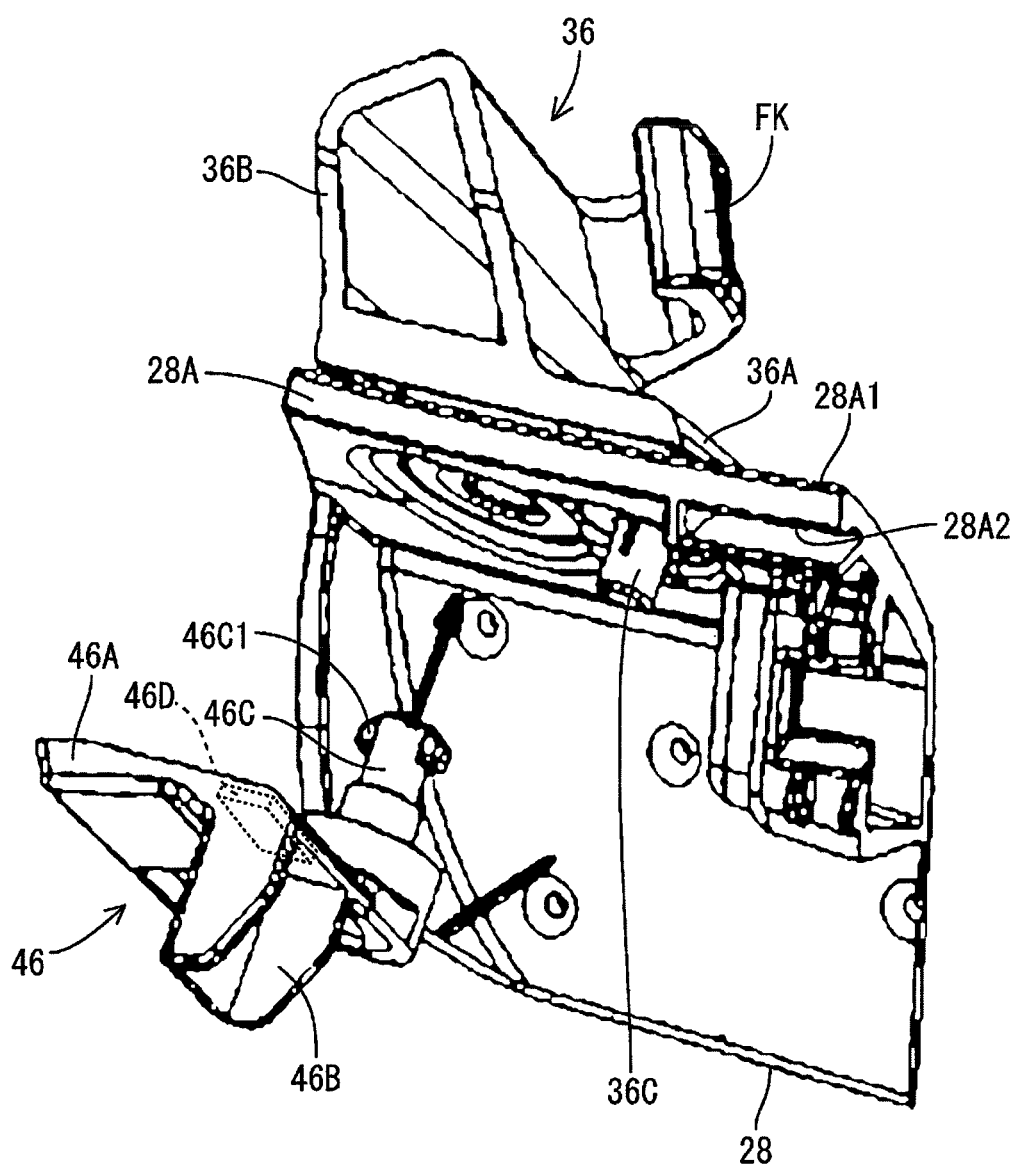
FIG. 10 is a perspective view of the hook member and the upper surface of the door trim in a process (2) in which the hook member is mounted to a part of the upper surface portion.

In mounting the hook member 26 to the upper surface portion 28A of the door trim 28, the contact portion 36A of the main body 36 of the hook member 26 is provided on the front surface 28A1 of the upper surface portion 28A. As illustrated in FIG. 9, the main body 36 is positioned such that the first coupling pin 36 corresponds to the first mounting hole 28B and the first coupling hole 36D corresponds to the second mounting hole 28C. Then, the first coupling pin 36C is inserted through the first mounting hole 28B and the guide portions 36E provided on either sides of the first coupling hole 36D are inserted through the second mounting hole 28C (see FIG. 9). Accordingly, the contact portion 36A comes in contact with the front surface of the upper surface portion 28A of the door trim 28 and the main body 36 is maintained to be fixed horizontally (in the front-and-rear direction of the vehicle, in the inner-and-outer direction of the compartment) with respect to the upper surface portion 28A by the first coupling pin 36C and the guide portions 36E, as illustrated in FIG. 10.

Next, the contact portion 46A of the clip portion 46 of the hook member 26 is provided on the rear surface 28A2 of the upper surface portion 28A. As illustrated in FIG. 10, the clip portion 46 is positioned such that the second coupling pin 46C corresponds to the second mounting hole 28C. In the state of the clip portion 46 illustrated in FIG. 6, a shape of the projection 46C1 of the second coupling pin 46C does not fit to a shape of the side openings 36D1 of the first coupling hole 36D. The clip portion 46 is required to be rotated by approximately 90 degrees such that the projection 46O1 fits to the side openings 36D1. Specifically, each of the side openings 36D1 of the first coupling hole 36D is formed to extend from the middle portion of the first coupling hole 36D to the front side and the rear side of the main body, respectively. The clip portion 46 is positioned such that the second coupling pin 46C corresponds to the second coupling hole 28C and the clip portion 46 is rotated in a clockwise direction around an axis of the second coupling pin 46C by 90 degrees from the state illustrated in FIG. 6. The rotated state of the clip portion 46 is illustrated in FIG. 10. Accordingly, the shape of the projection 46C1 of the second coupling pin 46C fits to the side openings 36D1 of the first coupling hole 36D. Then, the clip portion 46 is moved closer to the rear surface 28A2 of the upper surface portion 28A (refer to an arrow in FIG. 10). Accordingly, the second coupling pin 46C is inserted through the second mounting hole 28C and subsequently inserted through the first coupling hole 36D (illustrated by dashed lines in FIG. 11).

Figure 11:
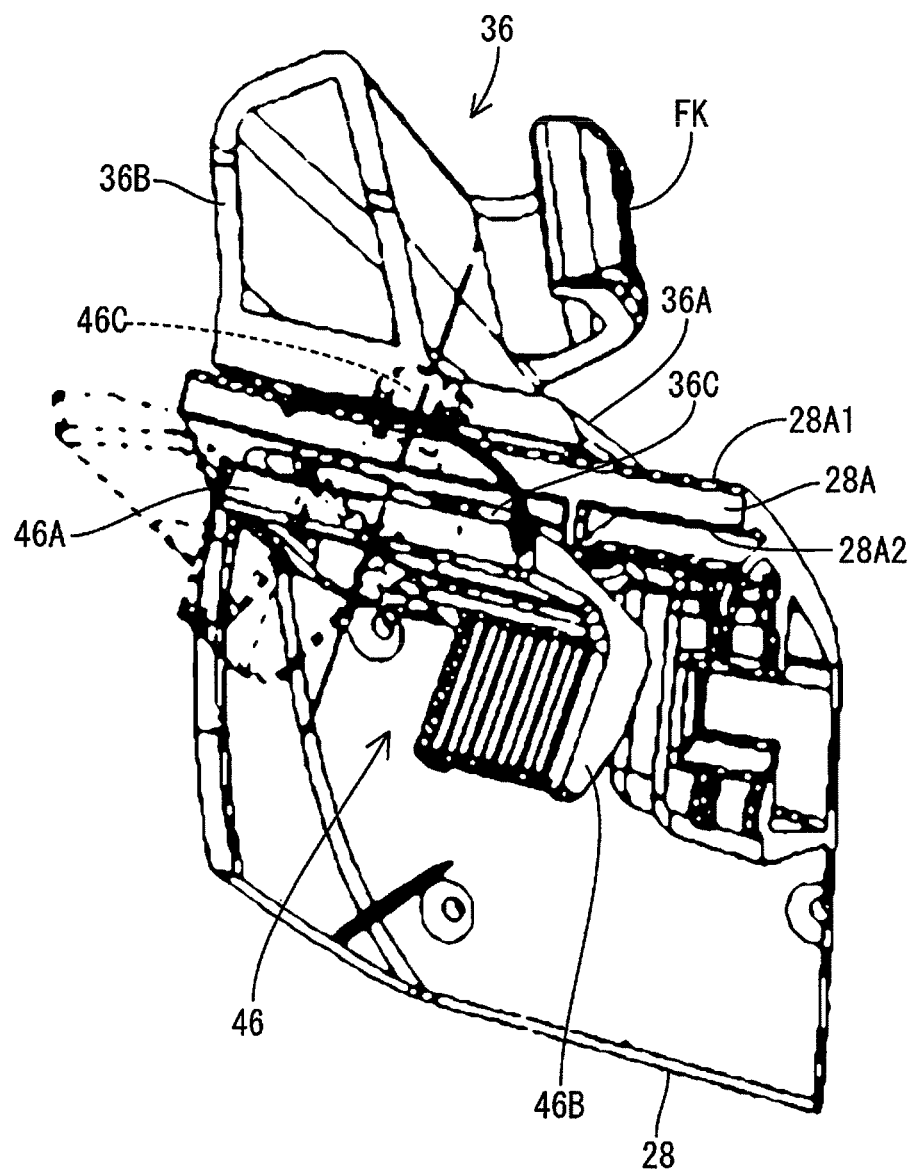
FIG. 11 is a perspective view of the hook member and the upper surface portion of the door trim in a process (3) in which the hook member is mounted to a part of the upper surface portion.
Figure 12:
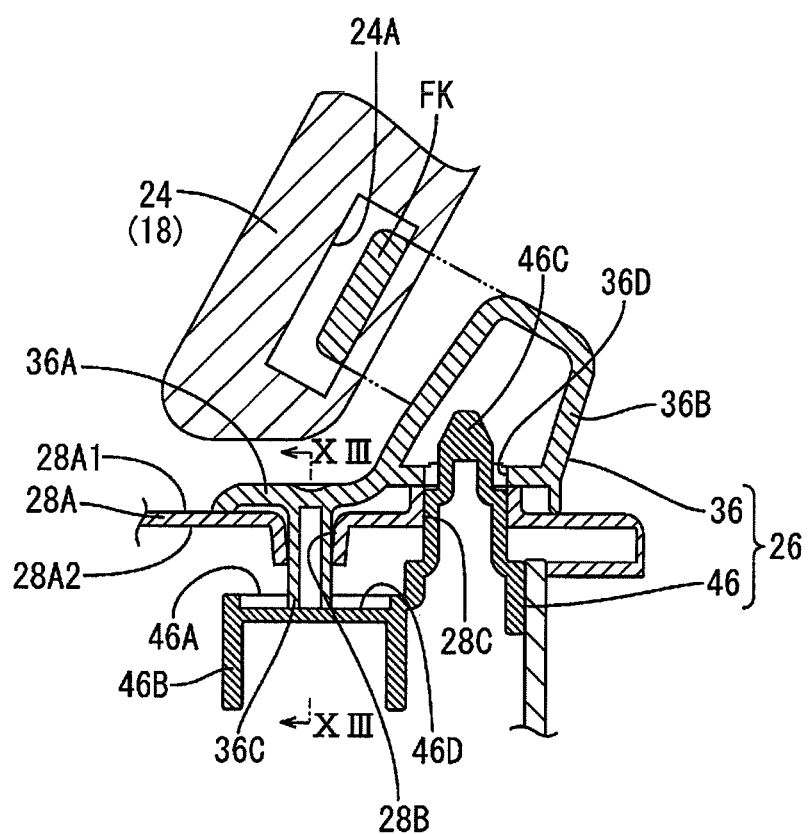
FIG. 12 is a cross-sectional view of the upper surface portion of the door trim and the hook member that is mounted to the upper surface portion taken along a height direction of the hook member.
Figure 13:
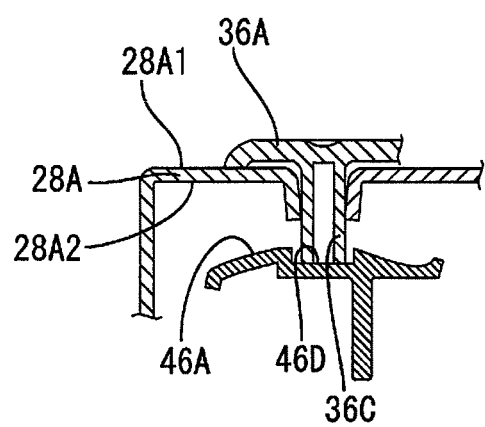
FIG. 13 is a cross-sectional view of FIG. 12 taken along a XIII-XIII line.

Next, in the state of the second coupling pin 46C being inserted through the first coupling hole 36D, the clip portion 46 is rotated in a counterclockwise direction around the axis of the second coupling pin 46C by 90 degrees (in a direction illustrated by an arrow in FIG. 11) as illustrated in FIG. 11. Accordingly, the side openings 36D1 of the first coupling hole 36D do not overlap the projection 4601 of the second coupling pin 46C and this fixes the second coupling pin 46C to the first coupling hole 36D. The distal end of the first coupling pin 36C projects slightly from the rear surface 28A2. If the clip portion 46 is rotated, the coupling groove 46D of the contact portion 46A is moved away from the rear surface 28A2 of the upper surface portion 28A. After the rotation of the clip portion 46 is completed, the contact portion 46A comes in contact with the rear surface 28A2 of the upper surface portion 28. Thus, the distal end of the first coupling pin 36C that is projected from the rear surface 28A2 of the upper surface portion 28A is housed in the coupling groove 46D (refer to FIGS. 12 and 13). As illustrated in FIG. 13, a width of the coupling groove 46D in the inner-and-outer direction of the compartment is slightly greater than a diameter of the distal end of the first coupling pin 36C. Therefore, the distal end of the first coupling pin 36C is housed in the coupling groove 46D such that the first coupling pin 36C is received and stopped by the coupling groove 46D. Accordingly, the clip portion 46 is arranged on the rear surface 28A2 of the upper surface portion 28A, and the main body 36 and the clip portion 46 are fitted to each other with sandwiching the upper surface portion 28A therebetween. According to the above steps, the hook member 26 (the main body 36 and the clip portion 46) is mounted to the upper surface portion 28A of the door trim 28. In the state that the main body 36 and the clip portion 46 are fitted to each other with sandwiching the upper surface portion 28A therebetween, the main body 36 and the clip portion 46 are fixed to each other with sandwiching the upper surface portion 28A therebetween, as illustrated in FIG. 12.

When the hook member 26 is removed from the upper surface portion 28A, the hook member 26 is removed therefrom by executing the reverse procedure to mounting the hook member 26 to the upper surface portion 28A. Specifically, the coupling groove 46D of the contact portion 46A is separated slightly from the rear surface 28A2 of the upper surface portion 28A and the clip portion 46 is rotated in a counterclockwise direction around the axis of the second coupling pin 46C by 90 degrees. Accordingly, the second coupling pin 46C is removed from the first coupling hole 36D and the clip portion 46 is removed from the upper surface portion 28A. Afterwards, the main body 36 is removed from the upper surface portion 28A. Thus, the hook member 26 of the present embodiment is easily mounted to the upper surface portion 28A of the door trim 28 and easily removed from the upper surface portion 28A of the door trim 28. Further, the hook member 26 is mounted to the upper surface portion 28A of the door trim 28, and this fixes the hook member 26 to the upper surface portion 28A. Therefore, the hook member 26 mounted to the upper surface portion 28A of the door trim 28 is preferably used as a member that keeps the second blind sheet 22 of the second sunshade 18 to be extended.

In the utility part assembly for mounting the hook member 26 to the vehicular interior part of the present embodiment, the first mounting hole 28B and the second mounting hole 28C are formed in the upper surface portion 28A of the door trim 28, and in the process of mounting the hook member 26 that is a utility part, the main body 36 is positioned with respect to the upper surface portion 28A of the door trim 28 and the second coupling pin 46C of the clip portion 46 is coupled to the first coupling hole 36D via the first mounting hole 28B. In such a state, the clip portion 46 is rotated by 90 degrees. This simple operation achieves coupling of the main body 36 and the clip portion 46 and accordingly the hook member 26 is mounted to the upper surface portion 28A of the door trim 28.

According to the present embodiment, the vehicle door 2 includes the side windows 12, 20, the window frame 14 and the second sunshade 18. The window frame 14 surrounds the outer rim of the side windows 12, 20. The second sunshade 18 is provided to the division frame 16, that is a part of the window frame 14, so as to be extended therefrom or housed therein. The second sunshade 18 that is extended shields light shining through the side window 20. The door trim 28 is provided on a lower side from the side windows 12, 20. The door trim 28 is provided as an example of the vehicular interior part in the utility part assembly for mounting the hook member 26 to the vehicular interior part according to the present embodiment. The hook member 26 that is a utility part is provided on the upper surface portion 28A of the door trim 28 that is provided close to the side windows 12, 20. The stopper hook FK that keeps the second sunshade 18 in the extended state is provided on the main body 36 of the hook member 26. Therefore, if a part that keeps the second sunshade 18 to be in an extended state cannot be provided on the window frame 14, the hook member 26 achieves a configuration that keeps the second sunshade 18 in the extended state.

In the utility part assembly for mounting the hook member 26 according to the present embodiment, the lifted portion 36B is provided on the main body 36 of the hook member 26. Accordingly, when the main body 36 is provided on the front surface 28A1 of the upper surface portion 28A, the lifted portion 36B is held by an operator and the main body 36 can be moved close to the front surface 28A1 of the upper surface portion 28A. This makes easy to provide the main body 36 on the front surface 28A1 of the upper surface portion 28A.

In the utility part assembly for mounting the hook member 26 according to the present embodiment, the lifted portion 46B is provided on the clip portion 46 of the hook member 26. Accordingly, when the clip portion 46 is rotated around the axis of the second coupling pin 46C with the second clip pin 46C being inserted through the first coupling hole 36D, the lifted portion 46B is held and the clip portion 46 can be rotated. This makes the clip portion 46 to be rotated easily.

In the utility part assembly for mounting the hook member 26 according to the present embodiment, the mounting holes 28C and 28D that are formed in the upper surface portion 28A of the door trim 28 are through holes having no screw grooves. This simplifies and shortens the manufacturing process compared to the conventional configuration having mounting holes with screw grooves.

<Second Embodiment>

A second embodiment will be explained with reference to FIGS. 14 and 15. In the second embodiment, a second coupling hole 146E is formed in a coupling groove 146D of a clip portion 146. Other configurations of the second embodiment are same as those of the first embodiment and the configurations, operations and effects will not be explained.

Figure 14:
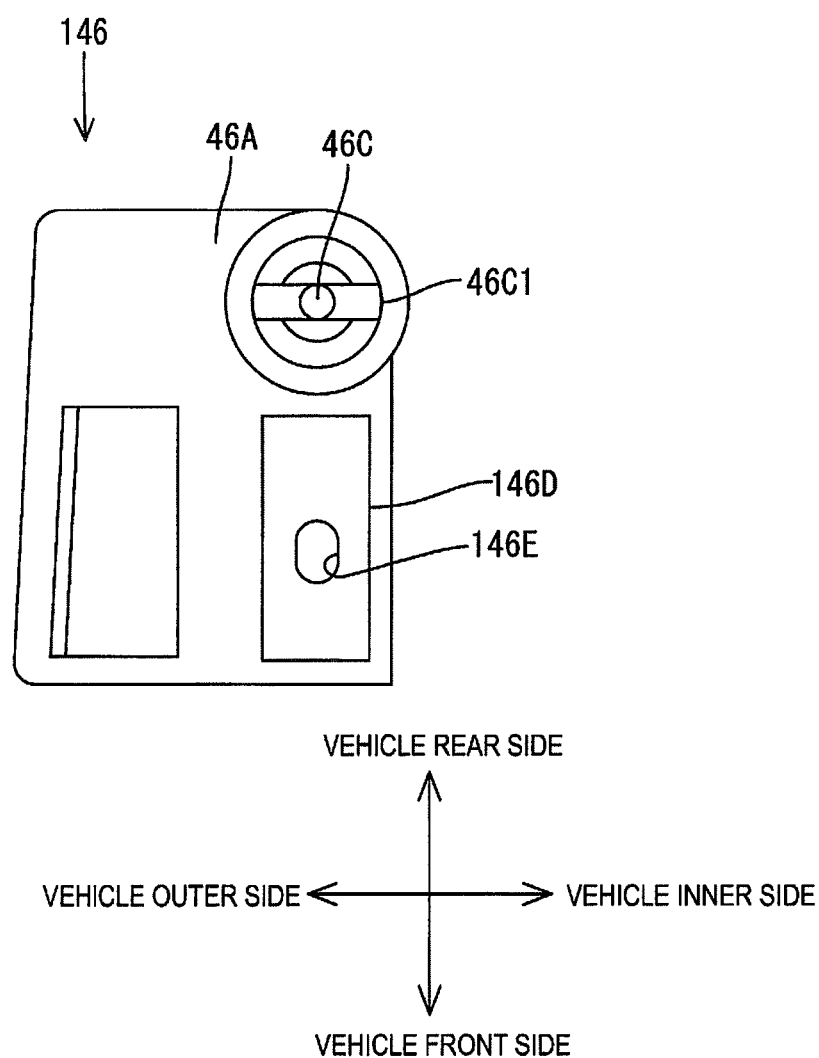
FIG. 14 is a plan view of a clip member of a hook member according to a second embodiment.
Figure 15:
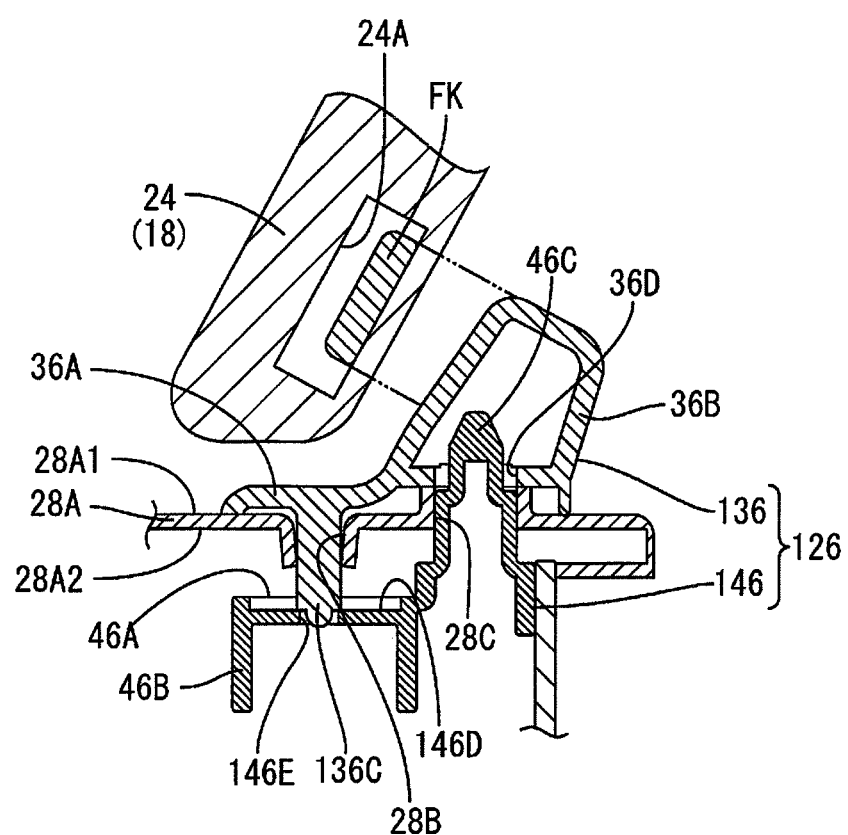
FIG. 15 is a cross-sectional view of an upper surface portion of a door trim and a hook member that is mounted to the upper surface of the door trim taken along a height direction of the hook member.

As illustrated in FIG. 14, the clip portion 146 of a hook member 126 of the second embodiment includes a second coupling hole 146E (an example of the second coupling portion) on a bottom surface of a coupling groove 146D. The second coupling hole 146E penetrates through the contact portion 46A. When the clip portion 146 is mounted to the main body 136 that is mounted to the upper surface portion 28A of the door trim 28, the distal end of the first coupling pin 136C is housed in the coupling groove 136D and further fitted in the second coupling hole 146E (refer to FIG. 15). Thus, the distal end of the first coupling pin 136 is fitted in the second coupling hole 146E and accordingly the distal end of the first coupling pin 136C is less likely to be removed from the clip portion 146. This fixes the clip portion 146 to the main body 136 securely.

<Third Embodiment>

A third embodiment of the present invention will be explained with reference to FIGS. 16 to 21. Same numbers and symbols as those in the above embodiments are applied to parts similar to those in the above embodiments and explanation thereof is omitted. In the above embodiments, the main body (the first member) includes the first coupling hole and the clip member (the second member) includes the second coupling pin. In a hook member 226 of the third embodiment, a main body 236 includes a second coupling pin 236D and a clip portion 246 includes a first coupling hole 247A.

Figure 16:
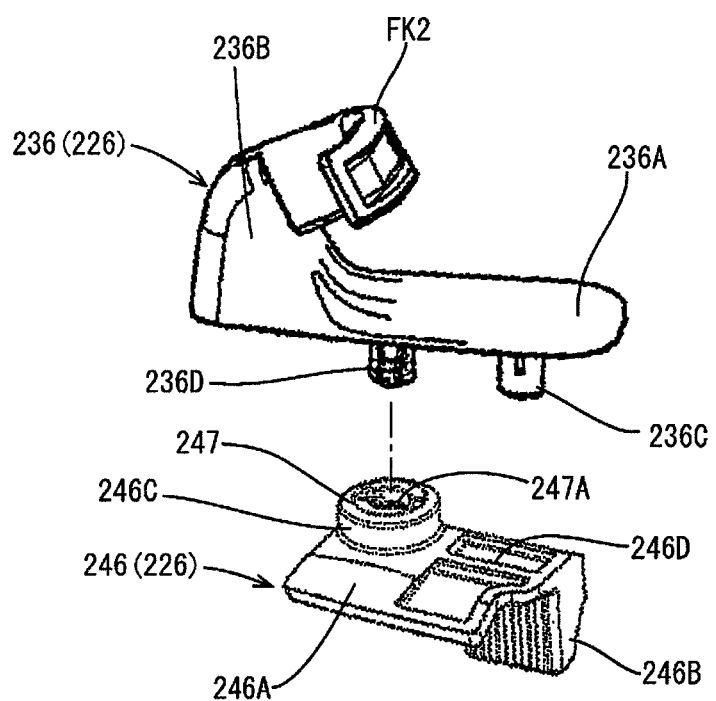
FIG. 16 is a perspective view of a hook member according to a third embodiment.
Figure 17:
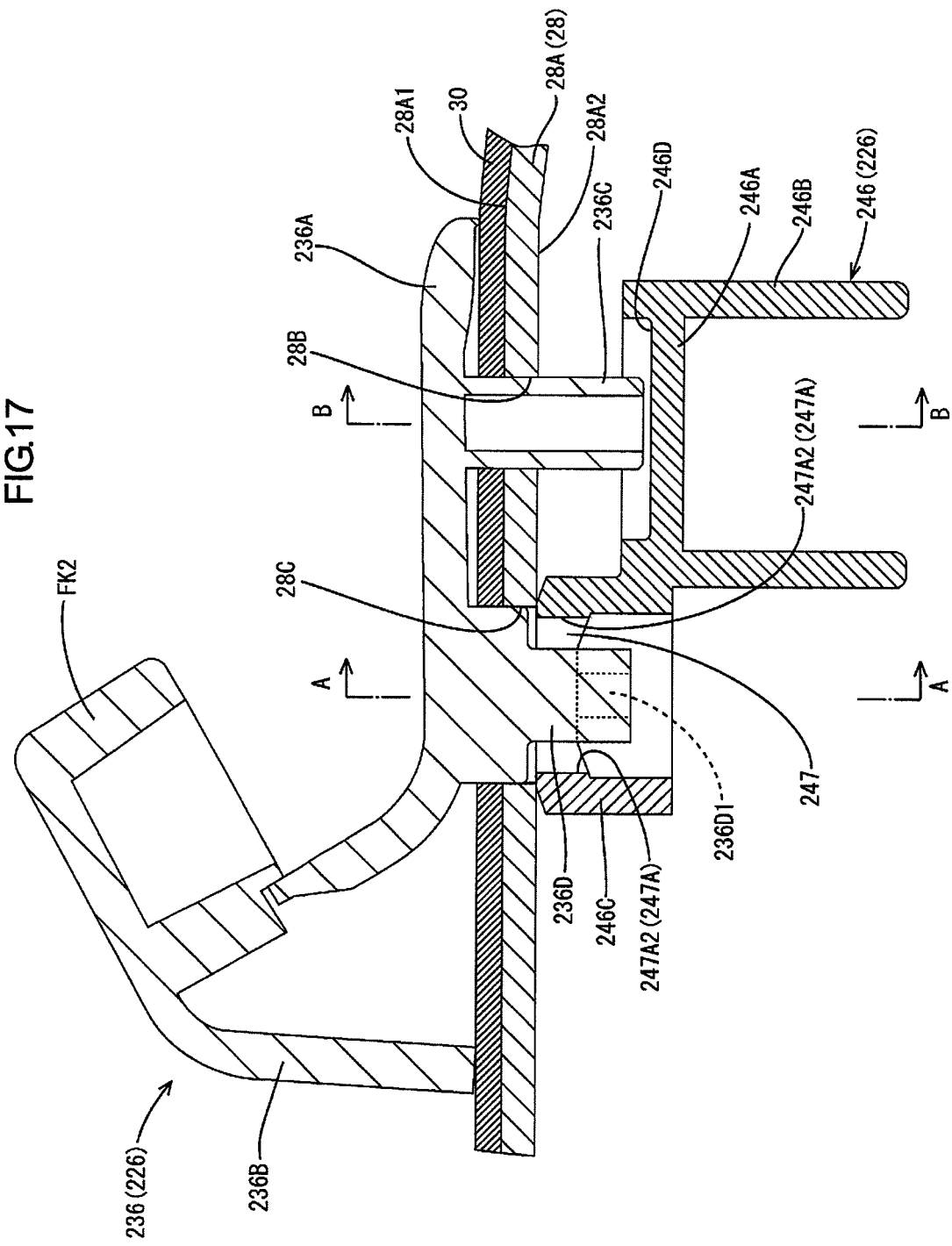
FIG. 17 is a cross-sectional view of the hook member according to the third embodiment.

A configuration of the main body 236 will be explained. As illustrated in FIGS. 16 and 17, the main body 236 comes in contact with the upper surface 28A1 of the upper surface portion 28A of the door trim 28. The main body 236 includes an elongated contact portion 236A and a lifted portion 236B that is lifted upwardly from one end portion of the contact portion 236A in its elongated direction.

A stopper hook FK2 (a stopper portion) is formed on an upper end portion of the lifted portion 236B and the stopper hook FK2 extends obliquely upward from the upper end portion of the lifted portion 236B. The stopper hook FK2 is formed in a hooked shape and engaged with the second frame 24 (refer to FIG. 1) of the second sunshade 18. In FIGS. 16 and 17, the right side corresponds to the vehicle front side (closer to the second sunshade 18) and the left side corresponds to vehicle rear side.

A first coupling pin 236C and a second coupling pin 236D are provided on a rear surface of the main body 236 (on a rear side of the contact portion 236A). Each of the first coupling pin 236C and the second coupling pin 236D is formed to axially project toward the upper surface portion 28A of the door trim 28 (eventually toward the clip portion 246).

As illustrated in FIG. 17, the first coupling pin 236C is inserted through the first mounting hole 28B formed through the upper surface portion 28A of the door trim 28. The first coupling pin 236C has a length so as to project downwardly (toward the clip portion 246) from the rear surface 28A2 of the upper surface portion 28A when being inserted through the first mounting hole 28B.

The second coupling pin 236D (one of the second coupling pin and the first coupling hole) is inserted through the second mounting hole 28C that is formed through the upper surface portion 28A of the door trim 28. Specifically, as illustrated in FIG. 17, the second coupling pin 236D is formed in substantially a columnar shape having a diameter smaller at its distal end portion than its basal end portion and the basal end portion is fitted to the second mounting hole 28C.

Figure 18:
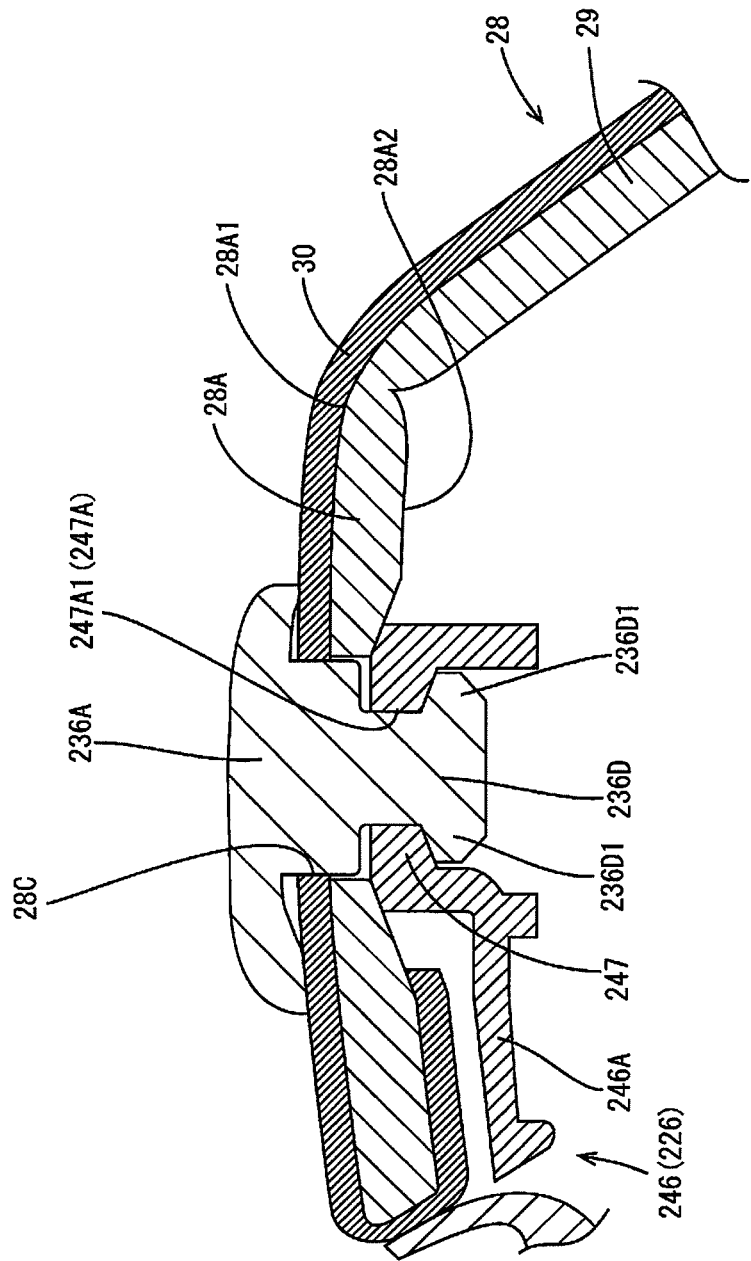
FIG. 18 is a cross-sectional view of the hook member taken along an A-A line in FIG. 17.

The second coupling pin 236D has a length such that its distal end portion projects downwardly (toward the clip portion 246) from the rear surface 28A2 of the upper surface portion 28A when being inserted through the second mounting hole 28C. As illustrated in FIG. 18, two projected portions 236D1 are formed on an outer peripheral surface of the distal end portion of the second coupling pin 236D. Each of the projected portions 236D1 projects outwardly in opposite directions.

Next, a configuration of the clip portion 246 will be explained. As illustrated in FIGS. 16 and 17, the clip portion 246 includes a clip board portion 246A and a lifted portion 246B. The clip board portion 246A is formed in a flat plate and the lifted portion 246B is lifted from a part of the clip base board portion 246A.

As illustrated in FIG. 16, a cylindrical portion 246C formed in a cylindrical shape is formed on a portion of the clip base board portion 246A that overlaps the second coupling pin 236D. As illustrated in FIGS. 16 and 21, a engagement groove 246D (an example of the coupling portion) is formed on a portion of the clip base board portion 246A that overlaps the first coupling pin 236C.

As illustrated in FIG. 17, the cylindrical portion 246C has an upper wall portion 247 that face the upper surface portion 28A of the door trim 28. A first coupling hole 247A is formed in the upper wall portion 247 corresponding to the second coupling pin 236D.

As illustrated in FIGS. 16 and 21, the first coupling hole 247A (another one of the second coupling pin and the first coupling hole) is formed a key hole. Specifically, the first coupling hole 247A is configured by a circular main opening 247A1 (refer to FIG. 18) and a pair of side openings 247A2 (refer to FIG. 21). The distal end portion of the second coupling pin 236D is inserted through the main opening 247A1. The side openings 247A2 are communicated with the main opening 247A1 and each of the side openings 247A2 extends in the vehicle front side and the vehicle rear side. Each of the side openings 247A2 extends in opposite directions from the main opening 247A1.

The coupling groove 246D is formed in a rectangular shape with a plan view and formed in a groove having a depth along a thickness direction of the clip base board portion 246A.

The first coupling hole 247A is formed so as to receive the second coupling pin 236D therethrough with the projected portions 236D1 of the second coupling pin 236D overlapping the side openings 247A2 of the first coupling hole 247A.

Figure 19:
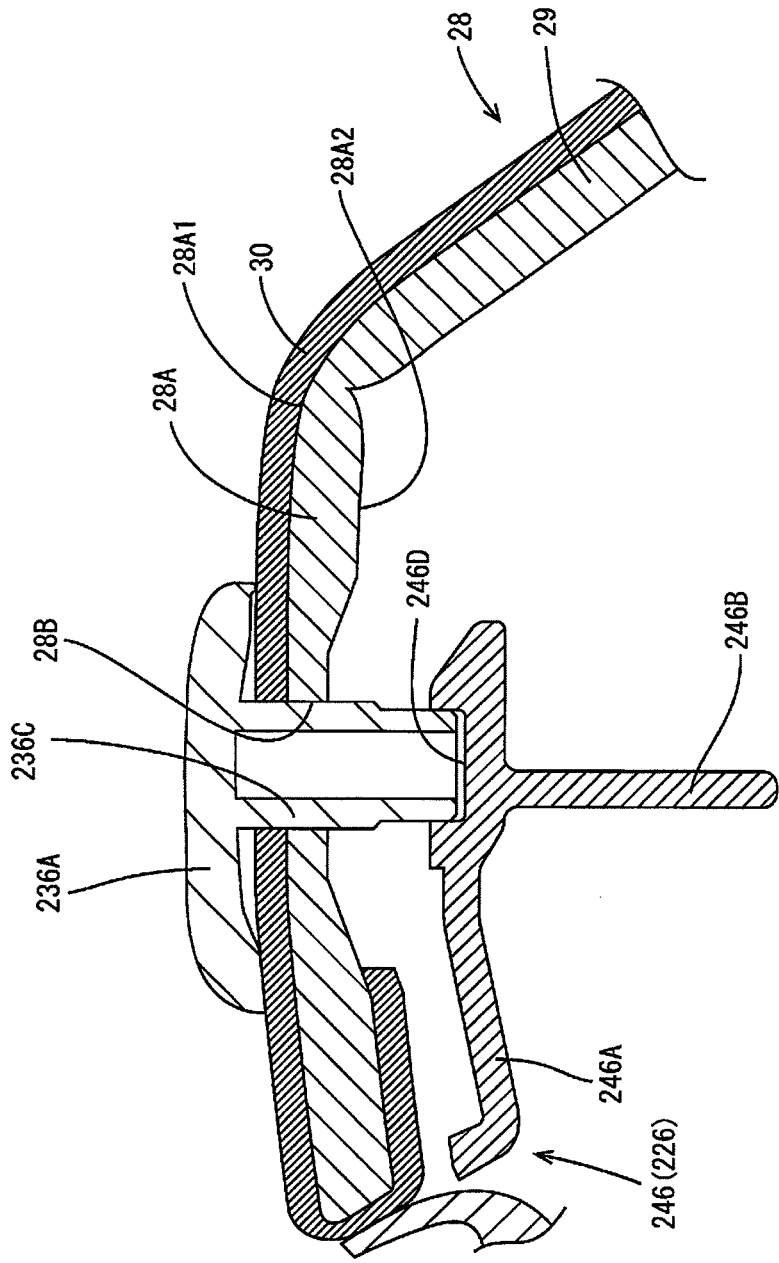
FIG. 19 is a cross-sectional view of the hook member taken along a B-B line in FIG. 17.

The coupling groove 246D is formed so as to receive the first coupling pin 236C. As illustrated in FIG. 19, a width of the coupling groove 246D is substantially equal to a diameter of the distal end portion of the first coupling pin 236C.

The main body 236 and the clip portion 246 become closer to each other from the front surface 28A1 side of the upper surface portion 28A of the door trim 28 and from the rear surface 28A2 side of the upper surface portion 28A. Accordingly, after being inserted through the second mounting hole 28C of the upper surface portion 28A, the second coupling pin 236D is inserted (coupled) to the first coupling hoed 247A. Further, after being inserted through the first mounting hole 28B of the upper surface portion 28A, the first coupling pin 236C is inserted (coupled) to the coupling groove 246D.

As illustrated in FIG. 16, the lifted portion 2468 is provided on a surface of the clip base board portion 246A that is opposite from the surface on which the coupling groove 246D is formed. The lifted portion 246D overlaps the coupling groove 246D.

Next, a method of mounting the main body 236 of the hook member 226 and the clip portion 246 to the upper surface portion 28A of the door trim 28 will be explained with reference to FIGS. 17 to 21. FIGS. 20 and 21 illustrate the main body 236 seen from a lower side.

The clip portion 246 is illustrated by a chain double-dashed line in FIGS. 20 and 21. In FIGS. 20 and 21, the upper surface portion 28A of the door trim 28 is not illustrated and a main wall portion 29 of the door trim 28 (a wall portion that is connected to the upper surface portion 28A, refer to FIG. 21) is illustrated by a chain double-dashed line.

First, the main body 236 is attached to the upper surface portion 28A. Specifically, the first coupling pin 236C of the main body 236 is inserted to the first mounting hole 28B of the upper surface portion 28A and the second coupling pin 236D is inserted to the second mounting hole 28C of the upper surface portion 28A. In other words, the second coupling pin 236D of the main body 236 overlaps the second mounting hole 28C.

Accordingly, the main body 236 is fixed in a horizontal direction (in the front-and-rear direction of the vehicle and in the inner-side and the outer-side direction of the compartment). The two pins 236C, 236D are inserted to the mounting holes 28B, 28C, respectively. This prevents the main body 236 from being rotated around one of the two pins. Therefore, the main body 236 and the clip portion 246 are positioned with each other easily in the subsequent mounting process for mounting the clip portion 246.

Next, the clip portion 246 is attached from a lower side to the main body 236 that is fixed to the upper surface portion 28A. Specifically, as illustrated in FIG. 20, the second coupling pin 236D of the main body 236 and the first coupling hole 247A of the clip portion 246 are positioned with each other.

The clip portion 246 is arranged such that the projected portions 236D1 of the second coupling pin 236D overlap the side openings 247A2 of the first coupling hole 247A, respectively. The clip portion 246 is moved closer to the second coupling pin 236D to insert (couple) the second coupling pin 236D to the first coupling hole 247A. Accordingly, the projected portions 236D1 pass through the side openings 247A and arranged at a lower side of the upper wall portion 247 of the cylindrical portion 246C.

Next, the clip portion 246 is rotated around an axis of the second coupling pin 236D by 90 degrees from the state illustrated in FIG. 20. In other words, the clip portion 246 is rotated such that the coupling groove 246D of the clip portion 246 moves closer to the first coupling pin 236C. The rotation direction of the clip portion 246 (the clockwise direction in FIG. 20) is illustrated by an arrow R1 in FIG. 20. When the clip portion 246 is rotated, the lifted portion 246B is held to rotate the clip portion 246 easily.

Due to the rotation of the clip portion 246, the side openings 247A2 do not correspond to the projected portions 236D1. The projected portions 236D1 are stopped by the peripheral edge of the main opening 237A1 of the upper wall portion 247 (in the state of FIG. 18). This prevents the second coupling pin 236D from being dropped off from the first coupling hole 247A and the main body 236 and the clip portion 246 are fixed to each other so as not to be separated from each other.

0066 According to the rotation of the clip portion 246, the coupling groove 246D of the clip portion 246 moves closer to the first coupling pin 236C. Then, after the clip portion 246 is rotated around its axis by 90 degrees from the state in FIG. 20, the arrangement direction of the side openings 247A2 is substantially perpendicular to the arrangement direction of the projected portions 236D1 (the state in FIG. 21). In such a state, the distal end of the first coupling pin 236C is fitted (coupled) to the coupling groove 246D.

Thus, the coupling of the first coupling pin 236C and the coupling groove 246D restricts the rotation of the clip portion 246 with respect to the main body 236. Because the rotation of the clip portion 246 with respect to the main body 236 is restricted, the projected portions 236D1 are restricted to be rotated with respect to the peripheral edge of the main opening 247A1. This restricts that the stoppage of the projected portions 236D1 by the peripheral edge of the main opening 247A1 is released.

According to the above procedure, the main body 236 and the clip portion 246 are coupled to each other with sandwiching the upper surface portion 28A therebetween. Accordingly, the hook member 226 (the main body 236 and the clip portion 246) are mounted to the upper surface portion 28A of the door trim 28.

When the hook member 226 is removed from the upper surface portion 28A, the hook member 226 is removed therefrom by executing the reverse procedure to mounting the hook member 226 to the upper surface portion 28A. The portion of the clip base board portion 246A on which the coupling groove 246D is formed is moved so as to be separated from the first coupling pin 236C of the main body 236 (downwardly in FIG. 17).

Accordingly, the first coupling pin 236C is removed from the coupling groove 246D and the clip portion 246 is rotatable with respect to the main body 236. The lifted portion 246B is provided on a side of the clip base board portion 246A that is opposite side to the surface on which the coupling groove 246D is formed. Therefore, an operator holds and pulls the lifted portion 246B downwardly and this easily moves downwardly the portion of the clip base board portion 246B on which the coupling groove 246D is formed.

The clip portion 246 is rotated with respect to the main body 236 in a counterclockwise direction in FIG. 21 by 90 degrees. Accordingly, the projected portions 236D1 and the side openings 247A2 overlap with each other. Therefore, the second coupling pin 236D is removed from the first coupling hole 247A and the clip portion 246 and the main body 236 are removed from the upper surface portion 28A.

The hook member 226 of the present embodiment is easily mounted to the upper surface portion 28A of the door trim 28 and easily removed from the upper surface portion 28A of the door trim 28. Further, because the hook member 226 is mounted to the upper surface portion 28A of the door trim 28 and accordingly, the hook member 226 is fixed to the upper surface portion 28A. Therefore, the hook member 226 that is mounted to the upper surface portion 28A of the door trim 28 is preferably used as the member that keeps the second blind sheet of the sunshade 18 to be in the extended state.

Other modifications of the above embodiments will be described below.

(1) In the above embodiments, the hook member is provided as a utility part. However, it is not limited thereto. For example, ornaments, a cup holder, an ash tray or an armrest may be examples of the utility parts.

(2) If the hook member is provided as the utility part like in the above embodiments, the first member may be the main body and the second member may be the clip portion (like in each of the embodiments) or the first member may be the clip portion and the second member may the main body. For example, the main body may include the coupling groove and the first coupling hole and the clip portion may include the first coupling pin and the second coupling pin. The stopper hook (the stopper portion) may be provided on at least one of the first member (having at least the first coupling pin) and the second member (having at least the second coupling portion).

(3) In the above embodiments, the side holes of the first coupling hole are formed to extend toward the front side and the rear side of the main body and the projected portions of the second coupling pin are formed to extend from the second coupling pin toward the inner side and the outer side of the clip portion. However, the configuration is not limited thereto. For example, the side holes may be formed to extend toward the inner side and the outer side of the main body and the projected portion may be formed to extend from the second coupling pin toward the front side and the rear side of the clip portion.

(4) In the above embodiments, the clip portion is rotated by 90 degrees to be coupled to the main body. However, the coupling configuration is not limited thereto. For example, the clip portion may be rotated by 180 degrees to be coupled to the main body. In such a case, a side opening may be formed on one side of the first coupling hole and a projection of the second coupling pin may be formed to extend from the second coupling pin toward one side. Further, for example, the clip portion may be pressed into the main body without being rotated. In such a case, a stopper may be formed on a part of the outer periphery of each of the first coupling pin and the second coupling pin. Each stopper may be coupled to each of the second coupling hole and the first coupling hole such that the main body and the clip portion may be fixed to each other so as to sandwich the upper surface portion of the door trim.

(5) In the above embodiments, the coupling portion corresponds to the coupling groove or a combination of the coupling groove and the coupling hole. However, the coupling pattern of the coupling portion is not limited. The coupling portion may include coupling structures other than the coupling groove or the coupling hole.

(6) As illustrated in FIG. 17, a skin 30 may be provided on the upper surface portion 28A of the door trim 28 so as to cover the surface 28A1 of the upper surface portion 28A in the third embodiment. The main body 236 may be provided on the surface 28A1 of the upper surface portion 28A (on the surface of the skin 30). The clip portion 246 may be provided on the surface 28A2 of the upper surface portion 28A.

As described above, in the third embodiment, the clip portion 246 is rotated with respect to the main body 236 to couple the first coupling pin 236C to the coupling groove 246D. In the third embodiment, the member that is to be rotated (the second member) is provided on the rear surface 28A2 of the upper surface portion 28A (on the surface on which the skin 30 is not provided).

For example, the second member (the member that is to be rotated) may be provided on the surface of the skin 30 and the first member may be provided on the surface of the upper surface portion 28A on which the skin 30 is not provided. If the second member is provided on the surface of the skin 30, the second member may be hardly rotated due to friction with the skin 30 caused by flexibility of the skin 30.

Therefore, if a part of the vehicular interior part (the upper surface portion 28A) is covered with the skin, the second member is preferably provided on the surface of the part of the vehicular interior part on which the skin is not provided like in the third embodiment. Accordingly, the second member is rotated without being influenced by the skin. This improves operability.

The embodiments of the present invention have been described, however, the present invention is not limited to the above embodiments explained in the above description and the drawings. The technology described herein includes various modifications of the above embodiments.

Elements of technology described in this specification or illustrated in the drawings exert technical utility by each or a combination thereof. The elements of technology should not be limited to the combinations of the elements claimed in the original patent application. The technology described in this specification or illustrated in the drawings is provided for achieving multiple objectives at the same time. The technical utility of the technology is exerted when at least one of the objectives is achieved.

The invention claimed is:

1. A utility part assembly for a vehicle comprising:
    a vehicular interior part having a first surface facing a vehicular interior side and a second surface that is opposite to the first surface and faces a vehicular exterior side, the vehicular interior part having a first mounting hole and a second mounting hole; and
    a utility part including:
        a first member provided on the first surface of the vehicular interior part, the first member having a first coupling pin extending through the first mounting hole and further having a first coupling hole corresponding to the second mounting hole, and
        a second member provided on the second surface and having a second coupling pin extending through the second mounting hole and coupled to the first coupling hole, the second member further having a coupling portion that is coupled to the first coupling pin that extends through the first mounting hole such that the first member is non-rotatable, and
    wherein the second member is rotatable about an axis of the coupled second coupling pin against the second surface relative to the first member such that upon rotation of the second member, the second member is fixed to the first member to sandwich a part of the vehicular interior part therebetween.

2. The utility part assembly according to claim 1, wherein the vehicular interior part is a door trim that is included in a vehicular door,
    the vehicular door further includes a window, a window frame that surrounds an outer edge of the window and a sunshade that is provided on a part of the window frame so as to be extended therefrom and housed therein and is extended to block light entering through the window,
    the utility part is provided on an upper surface portion of the door trim that is exposed to the window, and
    the first member of the utility part includes a stopper portion that maintains the sunshade in an extended state.

3. The utility part assembly according to claim 1, wherein the second coupling pin has a peripheral surface and a projection on a part of the peripheral surface, and
    the first coupling hole has an edge form that fits to an outer peripheral shape of the second coupling pin having the projection.

4. The utility part assembly according to claim 3, wherein the projection includes two or more projections.

5. The utility part assembly according to claim 3, wherein the projection includes two projections and each projection is provided on an opposite side from each other with respect to an axis of the second coupling pin.

6. The utility part assembly according to claim 1, wherein the coupling portion is formed in a groove and receives the first coupling pin.

7. The utility part assembly according to claim 6, wherein the first coupling pin has a projected portion provided on a distal end thereof, and
    the coupling portion has a bottom surface in the groove and a hole in the bottom surface and the projected portion is received in the hole.

8. The utility part assembly according to claim 1, further comprising a skin provided on the second surface of the vehicular interior part.

9. The utility part assembly according to claim 1, wherein the coupling portion of the second member is defined as a groove that receives a distal end portion of the first coupling pin of the first member, and an opening size of the groove is greater than a size of the distal end portion of the first coupling pin.

10. The utility part assembly according to claim 9, wherein the groove is a rectangular shape.

11. The utility part assembly according to claim 1, wherein the second member further includes a projection projecting from a surface of the second member opposite to a surface thereof including the coupling portion.

12. A utility part assembly for a vehicle comprising:
a vehicular interior component having a first surface facing a vehicular interior side, and further having a second surface opposite the first surface and facing a vehicular exterior side, the vehicular interior component having a first mounting hole and a second mounting hole; and
a utility part comprising:
  a first member provided on the first surface of the vehicular interior component, the first member having a first coupling pin extending through the first mounting hole, and further having a second coupling pin extending through the second mounting hole; and
  a second member provided on the second surface and having a coupler and a first coupling hole, the coupler coupled to the first coupling pin extending through the first mounting hole, and the first coupling hole coupled to the second coupling pin extending through the second mounting hole, such that the first member is non-rotatable, and
wherein the second member is rotatable about an axis of the second coupling pin against the second surface relative to the first member such that upon rotation of the second member, the second member is fixed to the first member to sandwich a part of the vehicular interior component therebetween.

13. The utility part assembly according to claim 12, wherein the second member further has a projection projecting from a surface of the second member opposite to a surface thereof including the coupler.

14. The utility part assembly according to claim 12, wherein:
the vehicular interior component is a door trim that is included in a vehicular door,
the vehicular door further includes a window, a window frame that surrounds an outer edge of the window and a sunshade that is provided on a part of the window frame so as to be extended therefrom and housed therein and is extended to block light entering through the window,
the utility part is provided on an upper surface of the door trim that is exposed to the window, and
the first member the utility part includes a stopper configured to maintain the sunshade to be in an extended state.

* * * * *